United States Patent
Zilberman et al.

(10) Patent No.: US 12,210,106 B2
(45) Date of Patent: Jan. 28, 2025

(54) METHOD, APPARATUS, AND SYSTEM FOR DETECTING AND CHARACTERIZING PARKING EVENTS BASED ON SENSOR DATA

(71) Applicant: HERE Global B.V., Eindhoven (NL)

(72) Inventors: Silviu Zilberman, Rishon le-Zion (IL); Harel Primack, Rishon le-Zion (IL)

(73) Assignee: HERE Global B.V., Eindhoven (NL)

( * ) Notice: Subject to any disclaimer, the term of this patent is extended or adjusted under 35 U.S.C. 154(b) by 604 days.

(21) Appl. No.: 17/488,181

(22) Filed: Sep. 28, 2021

(65) Prior Publication Data

US 2023/0100346 A1    Mar. 30, 2023

(51) Int. Cl.
*G01S 19/49* (2010.01)
*B60W 40/10* (2012.01)
(Continued)

(52) U.S. Cl.
CPC ............ *G01S 19/49* (2013.01); *B60W 40/10* (2013.01); *G01P 15/00* (2013.01); *G07C 5/0808* (2013.01); *G07C 5/0816* (2013.01)

(58) Field of Classification Search
CPC ........ G08G 1/148; G08G 1/142; G01S 19/49; B60W 40/10; G01P 15/00; G07C 5/0808; G07C 5/0816
(Continued)

(56) References Cited

U.S. PATENT DOCUMENTS

| 7,868,784 B2* | 1/2011 | Kuo | G08G 1/14 705/13 |
| 8,810,434 B2* | 8/2014 | Groult | B60Q 9/007 340/932.2 |

(Continued)

FOREIGN PATENT DOCUMENTS

| DE | 102012212347 A1 | 1/2014 |
| EP | 2302608 A2 | 3/2011 |

(Continued)

OTHER PUBLICATIONS

Naohisa Hashimoto et al., Automated Vehicle Mobile Guidance System for Parking Assistance, 2007, IEEE, pp. 630-635.*
(Continued)

*Primary Examiner* — Manglesh M Patel
(74) *Attorney, Agent, or Firm* — DITTHAVONG, STEINER & MLOTKOWSKI

(57) ABSTRACT

An approach is provided for determining a vehicle parking event and respective characteristics using sensor data. The approach, for example, involves receiving sensor data from at least one sensor associated with a mobile device in a vehicle. The approach also involves processing the sensor data to determine a sequence of semantic events. The semantic events respectively indicate a maneuver performed by the vehicle. The approach further involves processing the sensor data to determine a distance estimation over which at least one of the semantic events is performed. The approach further involves detecting a parking event of the vehicle, a (Continued)

characterization of the parking event, or a combination thereof based on the sequence of semantic events and the distance estimation. The approach further involves providing the parking event, the characterization of the parking event, or a combination thereof as an output.

20 Claims, 16 Drawing Sheets

(51) Int. Cl.
*G01P 15/00* (2006.01)
*G07C 5/08* (2006.01)

(58) Field of Classification Search
USPC .................................................. 701/33.4, 519
See application file for complete search history.

(56) References Cited

U.S. PATENT DOCUMENTS

| | | | | |
|---|---|---|---|---|
| 8,963,740 | B2* | 2/2015 | Koukoumidis | G08G 1/144 340/426.2 |
| 9,196,161 | B2* | 11/2015 | Lai | G08G 1/146 |
| 9,448,250 | B2 | 9/2016 | Pham et al. | |
| 9,487,101 | B2* | 11/2016 | Kees | G05D 1/0225 |
| 9,646,427 | B2 | 5/2017 | Chen et al. | |
| 9,812,015 | B1* | 11/2017 | Cox | G08G 1/147 |
| 9,834,222 | B2 | 12/2017 | Shin et al. | |
| 10,013,817 | B2 | 7/2018 | Hasenfratz et al. | |
| 10,043,388 | B1* | 8/2018 | Kahn | G06Q 50/40 |
| 10,306,428 | B1* | 5/2019 | Khanna | H04W 4/38 |
| 10,308,243 | B2* | 6/2019 | Lavoie | B60W 50/14 |
| 10,366,610 | B2* | 7/2019 | Ha | G08G 1/148 |
| 10,373,494 | B1 | 8/2019 | Krysiuk | |
| 10,410,445 | B2* | 9/2019 | Muthusamy | H04W 4/029 |
| 10,538,149 | B1 | 1/2020 | Dicarlo et al. | |
| 10,539,676 | B2 | 1/2020 | Li et al. | |
| 10,713,943 | B1* | 7/2020 | Mubarek | G07C 5/008 |
| 10,733,891 | B2* | 8/2020 | Chow | G08G 1/04 |
| 10,737,690 | B2* | 8/2020 | Lavoie | H04B 17/318 |
| 10,814,866 | B2* | 10/2020 | Lavoie | B60R 25/24 |
| 10,821,973 | B2 | 11/2020 | Glebov et al. | |
| 10,852,153 | B2* | 12/2020 | Yun | B62D 1/02 |
| 10,974,717 | B2* | 4/2021 | Golgiri | H04W 4/023 |
| 11,081,006 | B2* | 8/2021 | Klochikhin | G01P 15/14 |
| 11,373,528 | B2* | 6/2022 | Obayashi | G08G 5/0069 |
| 11,414,069 | B1* | 8/2022 | Ko | G08G 1/148 |
| 11,482,015 | B2* | 10/2022 | Shih | G06V 10/764 |
| 11,518,464 | B2* | 12/2022 | Begleiter | B62J 3/10 |
| 11,676,430 | B2* | 6/2023 | Tammali | G06N 20/10 701/33.4 |
| 2007/0050240 | A1 | 3/2007 | Belani | G08G 1/14 705/13 |
| 2011/0307188 | A1* | 12/2011 | Peng | G01C 21/3697 702/33 |
| 2012/0029764 | A1* | 2/2012 | Payne | G07C 5/0891 348/148 |
| 2013/0261880 | A1* | 10/2013 | Cho | G07C 5/0866 701/32.4 |
| 2013/0297198 | A1 | 11/2013 | Vande Velde et al. | |
| 2014/0058711 | A1* | 2/2014 | Scofield | G06Q 10/04 703/6 |
| 2014/0139359 | A1* | 5/2014 | Paul | G08G 1/148 705/13 |
| 2014/0232569 | A1* | 8/2014 | Skinder | G01C 21/16 340/989 |
| 2014/0278081 | A1* | 9/2014 | Iwuchukwu | G01C 21/3679 701/519 |
| 2015/0154711 | A1 | 6/2015 | Christopulos et al. | |
| 2015/0154868 | A1 | 6/2015 | Neuner et al. | |
| 2015/0177362 | A1* | 6/2015 | Gutierrez | H04W 4/027 701/519 |
| 2015/0371541 | A1 | 12/2015 | Korman | |
| 2016/0016590 | A1 | 1/2016 | Fernandez Pozo et al. | |
| 2016/0176408 | A1* | 6/2016 | Lynch | B60W 60/0053 701/23 |
| 2017/0118307 | A1* | 4/2017 | Beaurepaire | H04W 4/40 |
| 2018/0033302 | A1* | 2/2018 | Chan | G08G 1/144 |
| 2018/0350157 | A1* | 12/2018 | Koreishi | G07B 15/02 |
| 2020/0132473 | A1* | 4/2020 | Shipley | G01C 21/1652 |
| 2020/0152061 | A1* | 5/2020 | Adelsberger | G08G 1/148 |
| 2020/0193740 | A1 | 6/2020 | Sabina | |
| 2020/0202209 | A1 | 6/2020 | Mao et al. | |
| 2020/0217669 | A1 | 7/2020 | Hu et al. | |
| 2021/0019671 | A1* | 1/2021 | Cao | G08G 1/146 |
| 2021/0371030 | A1* | 12/2021 | Begleiter | B62J 27/00 |
| 2022/0165155 | A1* | 5/2022 | Peng | G08G 1/0129 |
| 2022/0281337 | A1* | 9/2022 | Meessen | G05D 1/0225 |
| 2023/0087202 | A1* | 3/2023 | Lavoie | G05D 1/0016 701/2 |
| 2023/0100851 | A1* | 3/2023 | Zilberman | G01C 21/206 701/423 |
| 2023/0104188 | A1* | 4/2023 | Zilberman | G01P 21/00 701/33.1 |
| 2023/0166725 | A1* | 6/2023 | Tsimhoni | G06F 3/0482 701/25 |
| 2023/0185298 | A1* | 6/2023 | Boehm | G06V 20/56 701/2 |
| 2023/0206764 | A1* | 6/2023 | Zilberman | G08G 1/142 |

FOREIGN PATENT DOCUMENTS

| | | |
|---|---|---|
| EP | 3336488 A1 | 6/2018 |
| EP | 3352155 A1 | 7/2018 |
| WO | 2013043228 A1 | 3/2013 |
| WO | 2018225067 A1 | 12/2018 |

OTHER PUBLICATIONS

Massaki Wada et al., Development of Advanced Parking Assistance System, Feb. 2003, IEEE, pp. 1-14 (pdf).*

Guy Krasner et al., Automatic Parking Identification and Vehicle Guidance with Road Awareness, 2016, ISCEE, pp. 1-5 (pdf).*

Mahendra B M et al., IoT Based Sensor Enabled Smart Car Parking for Advanced Driver Assistance System, 2017, IEEE, pp. 2188-2193.*

Liu et al., "A Vehicle Steering Recognition System Based on Low-Cost Smartphone Sensors", Article, Sensors 2017, 17(3), Published: Mar. 20, 2017, pp. 1-29.

Zhao et al., "Smartphone-based Real Time Vehicle Tracking in Indoor Parking Structures", IEEE Transactions on Mobile Computing, vol. 1, No. 1, Mar. 2017, pp. 1-14.

Wikipedia, "Altimeter", retrieved on Sep. 23, 2021 from https://www.wikiwand.com/en/Altimeter, 3 pages.

Srivastava, "Android Activity Recognition API", Aug. 9, 2020, retrieved from https://abhiappmobiledeveloper.medium.com/android-activity-recognition-api-b7f61847d9dc, 15 pages.

Wikipedia, "OpenStreetMap", retrieved on Sep. 23, 2021 from https://www.wikiwand.com/en/OpenStreetMap, 23 pages.

Waze, "Driving Directions. Traffic Reports & Carpool Rideshares by Waze", retrieved on Sep. 23, 2021 from https://www.waze.com/, 5 pages.

\* cited by examiner

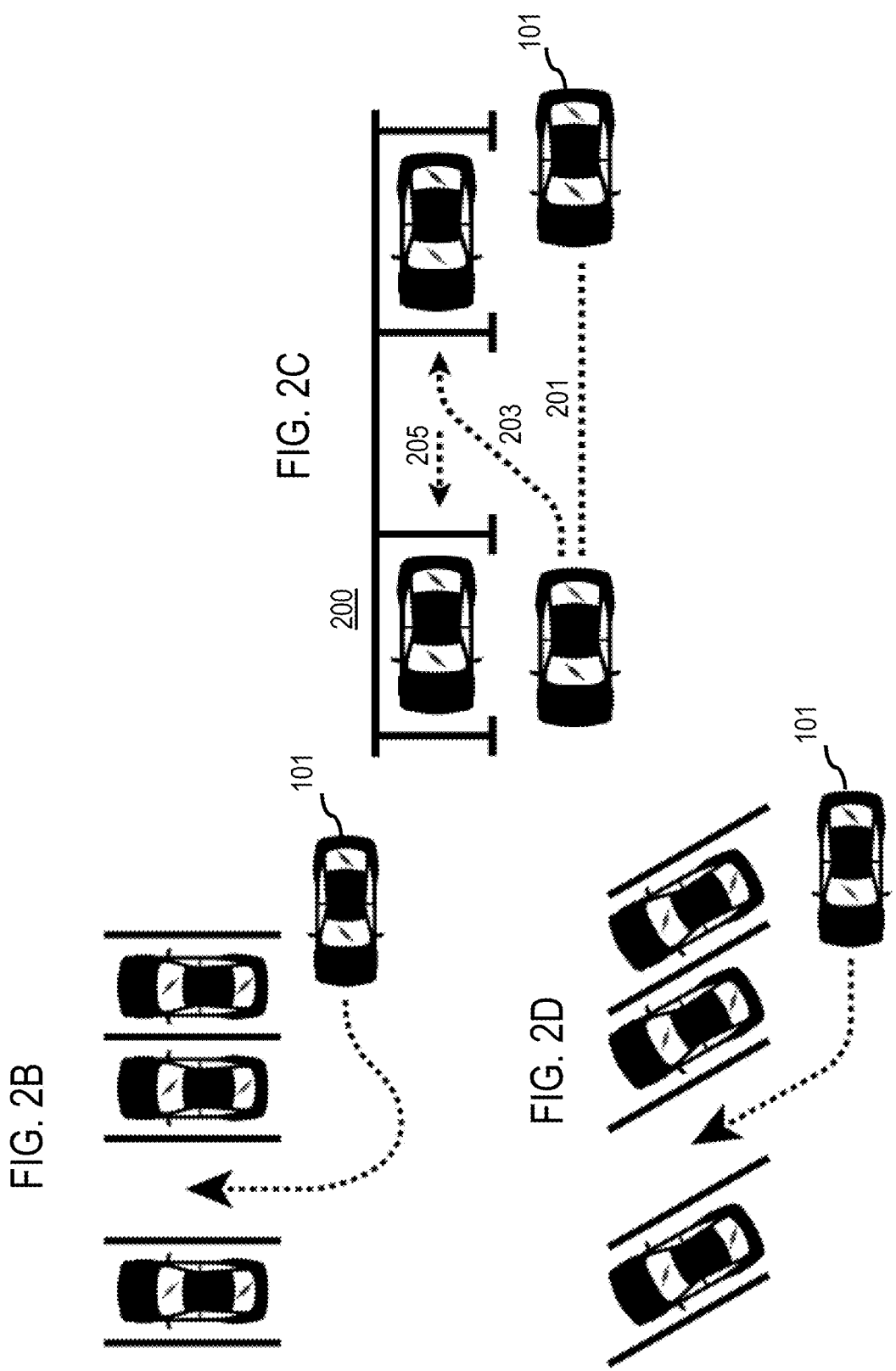

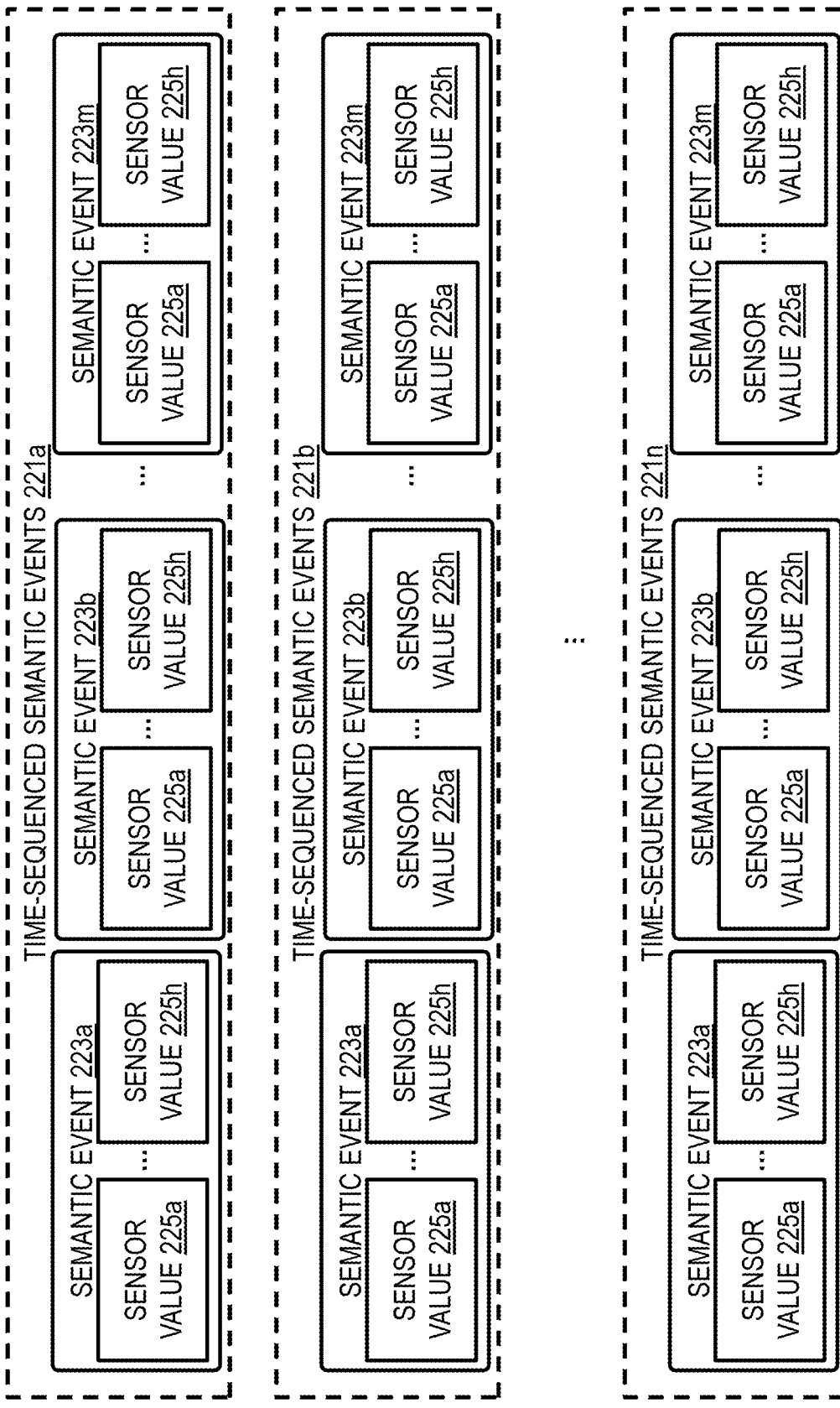

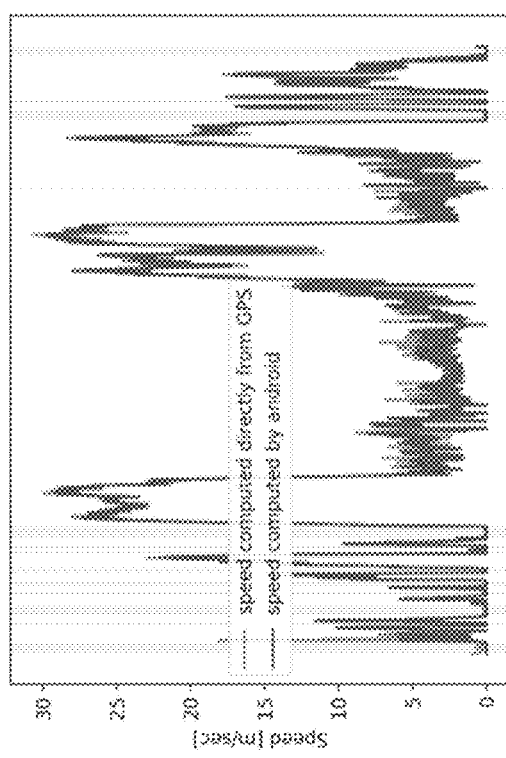
FIG. 6A
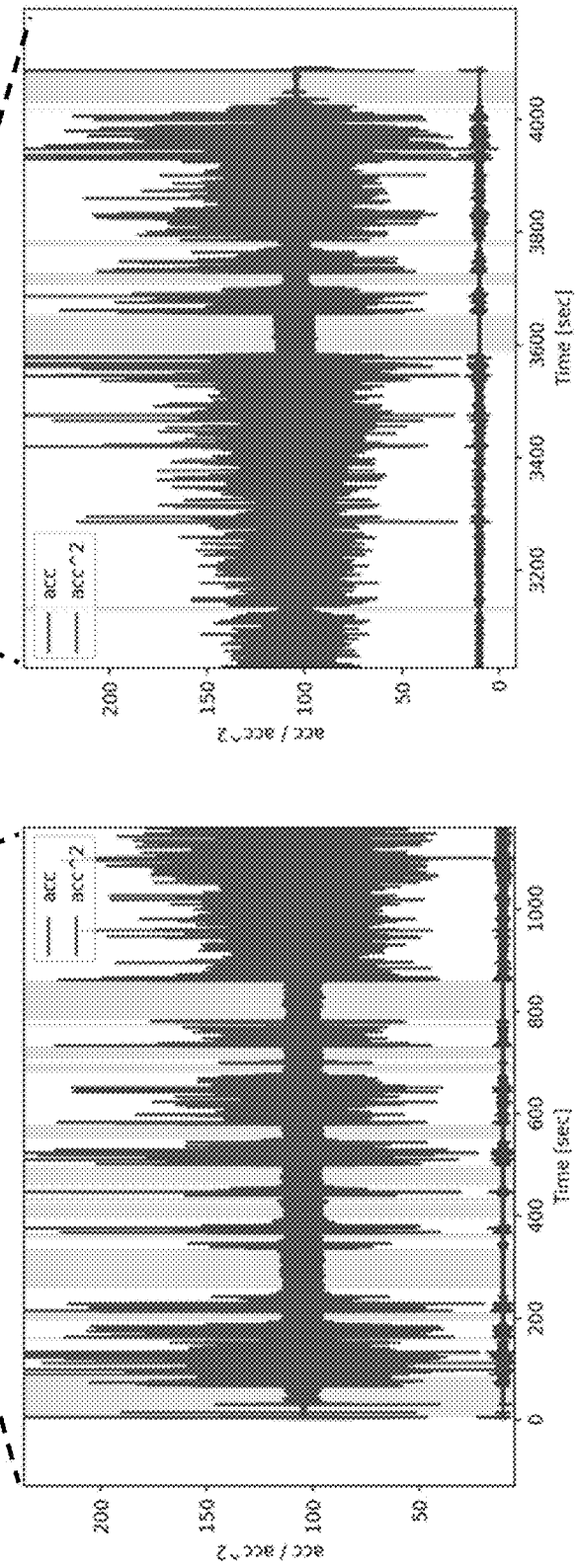
FIG. 6B
FIG. 6C

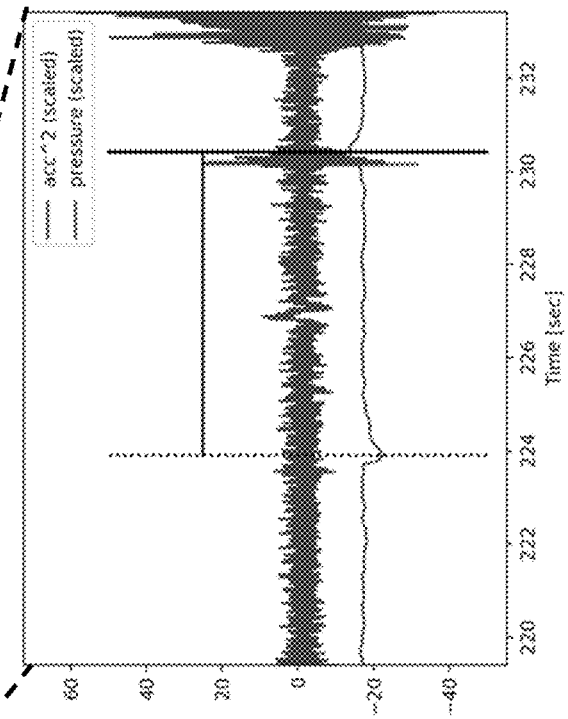
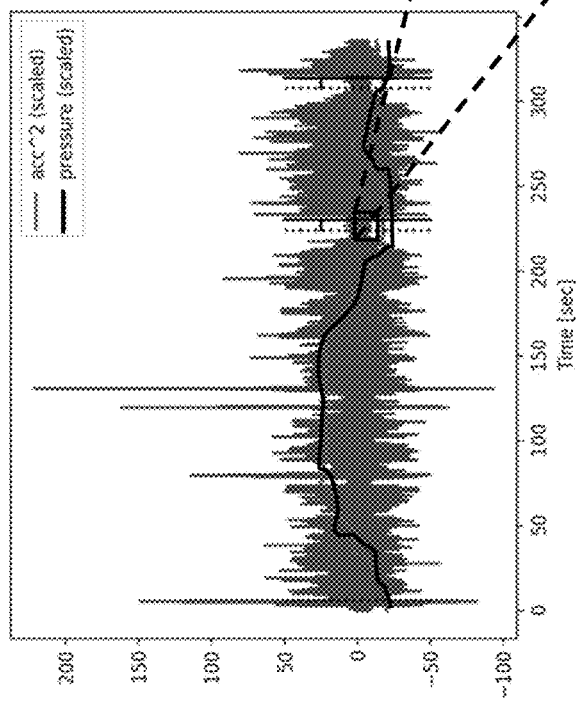
FIG. 7A
FIG. 7B

METHOD, APPARATUS, AND SYSTEM FOR DETECTING AND CHARACTERIZING PARKING EVENTS BASED ON SENSOR DATA

BACKGROUND

Many mapping, navigation, and/or other location-based services rely on knowing the location, speed, velocity, and/or acceleration of a vehicle to determine vehicle events such as starting a car, breaking or accelerating, turning, parking, and so on. Generally, the location, speed, velocity, and/or acceleration can be measured by or inferred from using Global Positioning System (GPS) data or other equivalent positioning technologies (e.g., other Global Navigation Satellite Systems—GNSS), and/or by using dedicated vehicle sensors. However, most mapping, navigation, and/or other location-based services provide the final results of vehicle parking events (e.g., identifying parking spots), without details and/or characteristics of the vehicle parking events (e.g., how the vehicle parked). For instance, such details can reveal drivers' parking proficiency. As a result, service providers face significant technical challenges to determine the details and/or characteristics of the vehicle motion during parking events.

SOME EXAMPLE EMBODIMENTS

Therefore, there is a need for an approach for detecting and characterizing parking events based on sensor data, including determining a sequence of semantic events and distance estimations.

According to one embodiment, a method comprises receiving sensor data from at least one sensor associated with a mobile device in a vehicle. The method also comprises processing the sensor data to determine a sequence of semantic events. The semantic events respectively indicate a maneuver performed by the vehicle. The method further comprises processing the sensor data to determine a distance estimation over which at least one of the semantic events is performed. The method further comprises detecting a parking event of the vehicle, a characterization of the parking event, or a combination thereof based on the sequence of semantic events and the distance estimation. The method further comprises providing the parking event, the characterization of the parking event, or a combination thereof as an output.

According to another embodiment, an apparatus comprises at least one processor, and at least one memory including computer program code for one or more computer programs, the at least one memory and the computer program code configured to, with the at least one processor, cause, at least in part, the apparatus to receive sensor data from a plurality of sensors associated with at least one mobile device in at least one vehicle. The apparatus is also caused to process the sensor data to determine a plurality of parking modes, wherein each of the parking mode includes a time-sequenced semantic events. Each of the time-sequenced semantic events indicates a maneuver performed by the at least one vehicle. The apparatus is further caused to detect a parking mode of a vehicle based on comparing a time-sequenced semantic events of the vehicle with and the time-sequenced semantic events of the plurality of parking modes. The apparatus is further caused to provide the parking mode as an output.

According to another embodiment, a computer-readable storage medium carries one or more sequences of one or more instructions which, when executed by one or more processors, cause, at least in part, an apparatus to receive sensor data from at least one sensor associated with a mobile device in a vehicle. The apparatus is also caused to process the sensor data to determine a sequence of semantic events. The semantic events respectively indicate a maneuver performed by the vehicle. The apparatus is further caused to process the sensor data to determine a distance estimation over which at least one of the semantic events is performed. The apparatus is further caused to detect a parking event of the vehicle, a characterization of the parking event, or a combination thereof based on the sequence of semantic events and the distance estimation. The apparatus is further caused to provide the parking event, the characterization of the parking event, or a combination thereof as an output.

According to another embodiment, an apparatus comprises means for receiving sensor data from a plurality of sensors associated with at least one mobile device in at least one vehicle. The apparatus also comprises means for processing the sensor data to determine a plurality of parking modes, wherein each of the parking mode includes a time-sequenced semantic events. Each of the time-sequenced semantic events indicates a maneuver performed by the at least one vehicle. The apparatus further comprises means for detecting a parking mode of a vehicle based on comparing a time-sequenced semantic events of the vehicle with and the time-sequenced semantic events of the plurality of parking modes. The apparatus further comprises means for providing the parking mode as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive. In particular, "speed" and "velocity" are used and can be used interchangeably along this manuscript.

BRIEF DESCRIPTION OF THE DRAWINGS

The embodiments of the invention are illustrated by way of example, and not by way of limitation, in the figures of the accompanying drawings:

FIGS. 2B-2G illustrating example parking events, according to various embodiments;

FIG. 2H is a diagram of example parking mode sequences, according to one embodiment;

FIGS. 6A-6C illustrating example speed/acceleration profiles of a vehicle, according to various embodiments;

FIGS. 7A-7B illustrating example pressure/acceleration profiles of a vehicle, according to various embodiments;

DESCRIPTION OF SOME EMBODIMENTS

Examples of a method, apparatus, and computer program for determining vehicle information (e.g., speed, tire/wheel diameter, safety/maintenance condition) are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent or similar arrangement. In other instances, well-known structures and devices are shown in block diagram form in order to avoid unnecessarily obscuring the embodiments of the invention.

Figure 1:
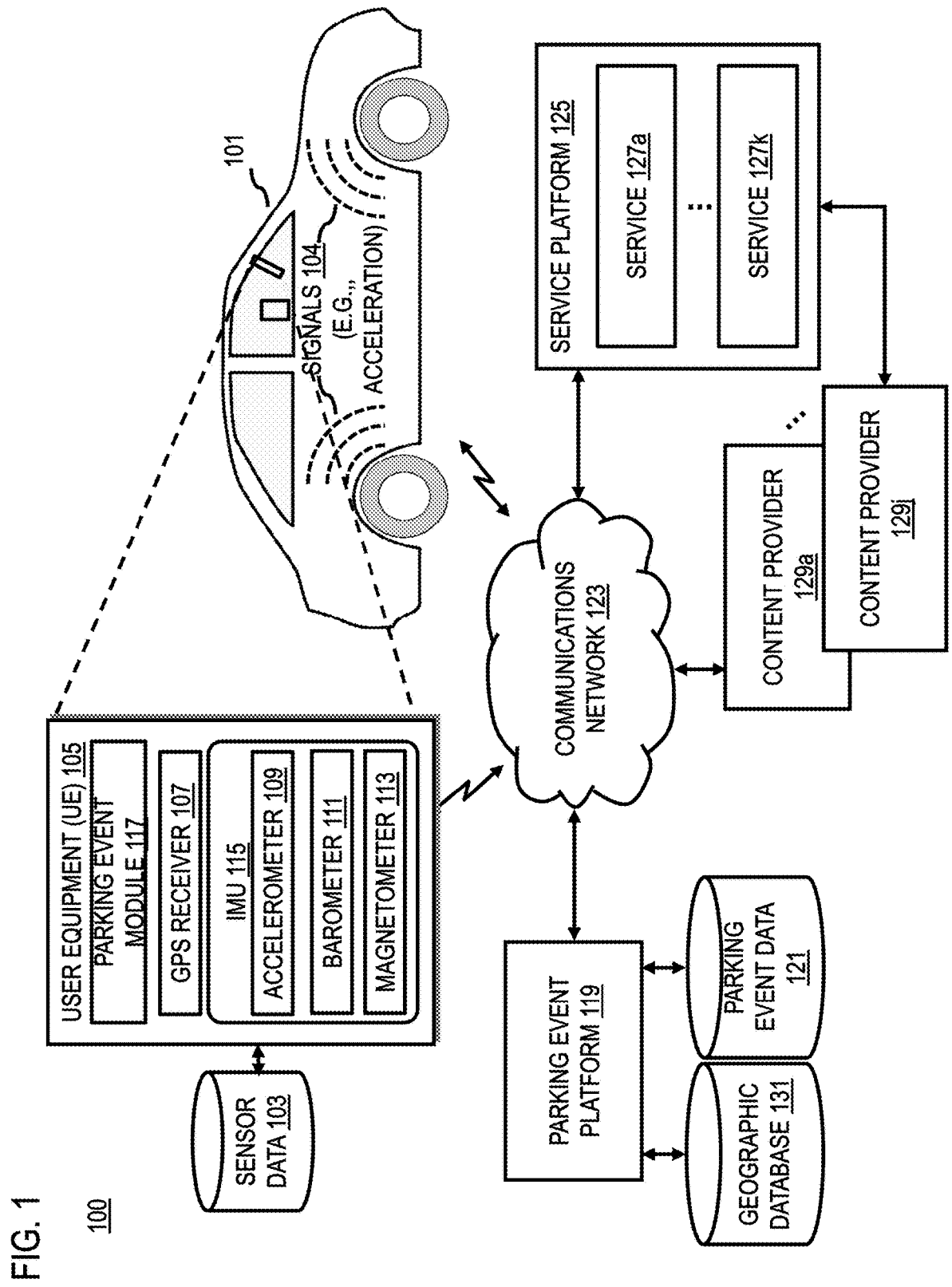
FIG. 1 is a diagram of a system capable of determining characteristics of a vehicle event (e.g., parking) based on sensor data, according to one embodiment.

FIG. 1 is a diagram of a system capable of determining characteristics of a vehicle event (e.g., parking) based on sensor data, according to one embodiment. Embodiments of the technology described herein relate to estimating the moving distance of a moving body (e.g., a vehicle) using sensor data, thereby determining characteristics of a parking event.

Parking is not an instantaneous event and can involve some maneuvers depending on the initial and final orientations of the vehicle and moving distances into a parking spot. The sensors commonly used to measure distances are GNSS/GPS and accelerometers. These maneuvers cannot be fully tracked using GNSS/GPS due to the limited accuracy and the low sampling rate (typically no more than 1 Hz and a spatial accuracy between 1-10 meters). Moreover, GNSS/GPS may become unavailable because of signal interference, loss of line-of-sight to orbiting satellites, etc., to estimate the location, speed, velocity, and/or acceleration of a vehicle and determine a parking event thereby detecting parking events and details. It is also useful to detect the kind/characteristics of parking took place, for example, to assist driver parking (e.g., a reverse left bay parking), to hint the driver where the vehicle was parked (e.g., an angled parking space), etc.

To address the technical challenges related to determining a parking event and its characteristics in view of the shortcomings of GPS/GNSS, the system 100 of FIG. 1 introduces a capability to estimating a moving distance over which at least one parking maneuver of a vehicle 101 based on sensor data 103 (e.g., from accelerometers, gyroscopes, magnetometers, barometers, etc.) from which a parking event and its details can be inferred.

For instance, acceleration data measured by an accelerometer can be used to calculate distance data and provide more details of a parking event than GNSS/GPS. In one embodiment, the sensor data 103 includes, for instance, measured acceleration signals 104 from smartphones or equivalent mobile devices (e.g., a user equipment (UE) device 105), which contain one or more location sensors (e.g., a GPS receiver 107), one or more acceleration sensors (e.g., an accelerometer 109), one or more atmospheric pressure meters (e.g., a barometer 111), one or more magnetic field meters (e.g., a magnetometer 113), etc. For example, the accelerometer 109 can sample up to 1 kHz to capture more distance changes of parking maneuvers and work at all times.

In one embodiment, during parking maneuvers, the system 100 can improve vehicle event interpretations by verifying the vehicle's short distance maneuvers using distance data calculated from acceleration data. For instance, the distance estimation can be obtained by integrating over the accelerometer readings. Existing components (e.g., accelerometers 109, etc.) in IMU 115's are not designed to measure the moving distance of the device over large distances (e.g., a UE 105 in which the IMU 115 is installed) due to drift errors.

Although it can be an unreliable approach using existing accelerometers in mobile devices due to drift error accumulation, the system 100 can apply this approach for the short distances/times that characterize parking maneuvers. The accuracy is not essential for such application, e.g., even 50% errors in distance estimations are good enough for detecting these short distance parking maneuvers, typically in 5-10 meters. The system 100 can use the last known state (e.g., position and velocity) and integrate once over the acceleration to get the updated locations and/or moving distances of the vehicle 101. Although the measurement error of the accelerometer 109 induces a drift in velocity and location estimation, the distance and/or trajectory of the vehicle 101 can be estimated only for a few seconds before the error accumulation makes it useless.

Figure 2A:
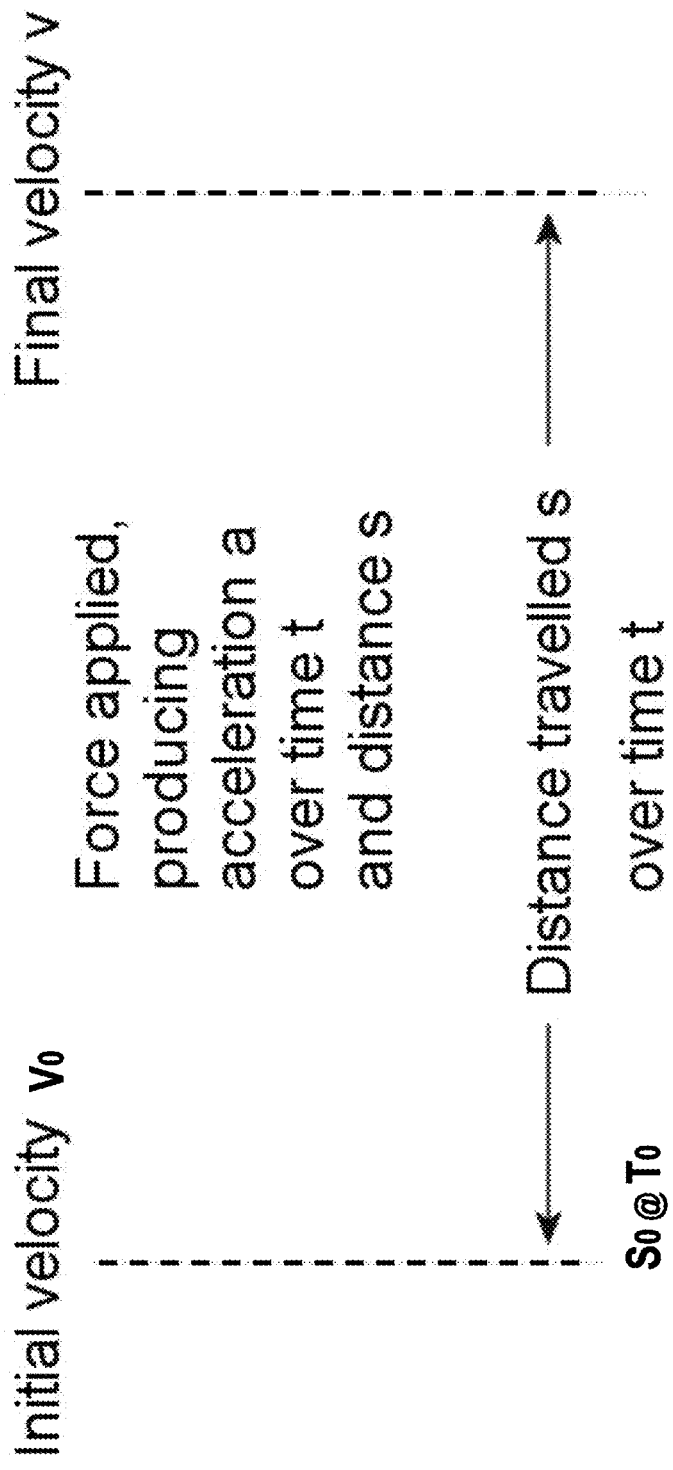
FIG. 2A a conceptual diagram of distance estimation by integrating over accelerometer readings, according to one embodiments.

FIG. 2A a conceptual diagram of distance estimation by integrating over accelerometer readings, according to one embodiments. In one embodiment, the system 100 can integrate acceleration signals 104 to get a moving distance of the vehicle 101 as follows.

Considering a vehicle of mass m, acted on by a force F for time t. This produces an acceleration a. The vehicle has an initial velocity v0, and after time t, it reaches a velocity v. It also travels a distance s. These five parameters associated with the vehicle in motion: v0, v, a, s and t. The system 100 can use the following equations to determine any of these parameters with the other known parameters.

$$v(t)=v0+at$$

$$s(t)=v0t+\frac{1}{2}at2+s0$$

$$v2=v02+2as$$

Acceleration is defined as the second derivative of a position with respect to time: $a=d2s/dt2$. Integrate this equation with respect to time to show that the position can be expressed as $s(t)=v0t+\frac{1}{2}at2+s0$, where v0 and s0 are the initial position and velocity at t=0.

Accordingly, in one embodiment, the system 100 can use existing sensors of the UE 105 (e.g., the accelerometer 109, etc.) to measure the moving distances or other characteristics/information (e.g., acceleration, etc.) of a vehicle 101 or other moving body. The estimated distances and their ranges can distinguish a parking event from a driving event. For instance, a distance range of street parking maneuvers is much shorter than a regular street driving maneuvers.

It is noted that the accelerometer 109 discussed with respect to the embodiments described herein are provided by way of illustration and not as limitations. It is contemplated that any other type of sensor (e.g., other than dedicated distance sensors or GNSS/GPS) that can provide surrogate information for deriving distances can be used. For example, microphones or other acoustic sensors can be used to record tire-pavement sounds resulting from "galumphing" motion of tires when parking that can be processed to determine rotational frequency/angle and ultimately moving distances. As another example, the system 100 can take advantage of independent speed measurements based on a frequency response of the magnetic field in the vehicle. Since magnetometer is sensitive to changes in the magnetic field and the vehicle tires in most cases are steel-belted radial tires that tend to be magnetized, the net effect is that tires behave as rotating magnets such that the tire rotation frequency (related to speeds thus moving distances) can be measured with the magnetometer.

The system 100 can then use the distance data calculated based on the acceleration data from the acceleration 109 in conjunction with sensor data (e.g., position, acceleration, magnetic field, angular rotation rate, etc.) from the other sensors (e.g. the GPS receiver 107, the barometer 111, the magnetometer 113, etc.) of the UE 105 to determine parking maneuvers of the vehicle 101. For example, the system 100 can detect vehicle states via engine sensor(s): a vehicle stop with its engine off, a vehicle idle with its engine on, a vehicle in motion, etc. Idling refers to running a vehicle's engine when the vehicle is not in motion. A vehicle idle state can be determined via vehicle and/or mobile device sensors, such as via determining vibrations cause by a vehicle engine (e.g., an internal combustion engine) based on accelerometer and/or gyroscope data. As another example, the system 100 can detect vehicle coordinates and directions of motion to determine if the vehicle is in forward or reverse drive. As another example, the system 100 can detect and quantify vehicle turns and lane changes (e.g., for street parking) based on the vehicle coordinates and directions of motion. For instance, the system 100 can detect and/or quantify vehicle turns by obtaining a rotation vector from a device frame of reference to a vehicle frame of reference, thereby obtaining the azimuthal and inclination angle.

FIGS. 2B-2G illustrate example parking maneuvers of a parking event, according to various embodiments. A parking event can be characterized as a parking type such as perpendicular, parallel, or angular parking, or a detailed parking mode such as left forward bay parking. Example can include: (1) perpendicular parking (e.g., left/right forward bay parking, left/right reverse bay parking, etc., and FIG. 2B depicted a right forward bay parking event), (2) parallel parking (e.g., left/right forward parallel parking, left/right reverse parallel parking, etc., and FIG. 2C showing a right reverse parallel parking event), (3) angular parking (e.g., left/right forward angular parking, left/right reverse angular parking, etc., and FIG. 2D depicted a right forward angular parking event), etc. In one embodiment, the system 100 can identify all the semantic events required to characterize the parking sequence, as building blocks for a parking event. Such parking event can be a structured time sequence of semantic events, such as a scenario of a parallel parking event 200 on the right-hand side of a road in reverse drive as shown in FIG. 2C. The sequence can go as: the vehicle 101 in forward drive 201—stop—right lane change in a reverse drive 203—stop—potential correction maneuver(s) 205 (such as short forward and backwards drives) to fit in a spot.

Figure 2E:
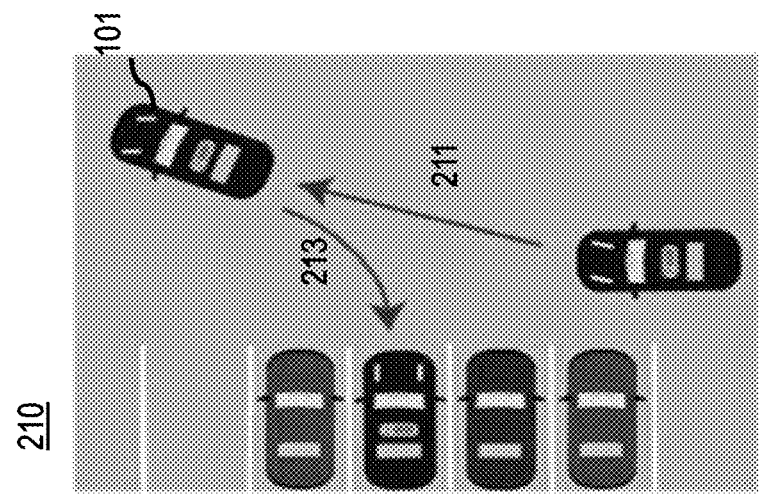
Figure 2F:
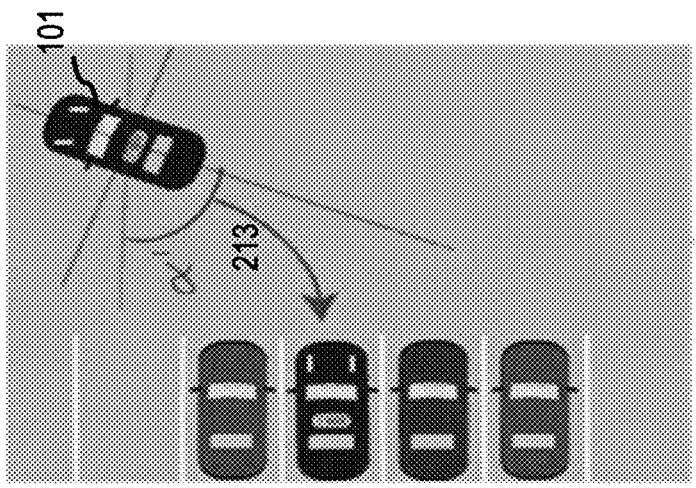
Figure 2G:
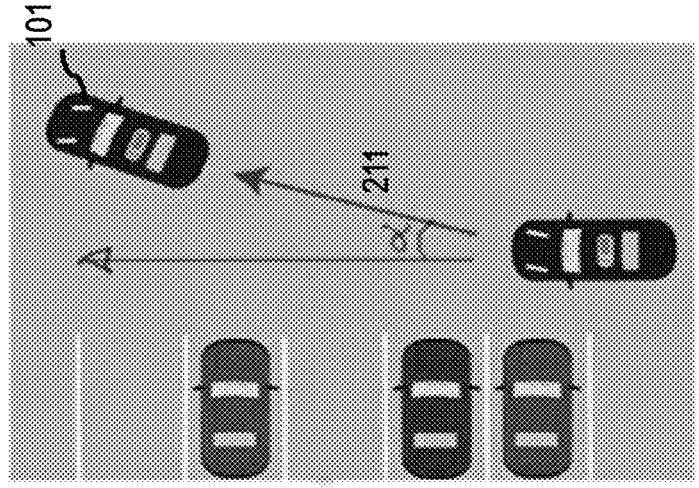

As another example, FIGS. 2E-2G illustrate a reverse left bay parking event 210 in an outdoor parking area starts with the vehicle 101 in a forward drive 211 at a slight right turn at an angle α and a full stop in FIG. 2E. The reverse left bay parking event 210 then ends with the vehicle 101 in a reverse drive 213 at an angle α' and a full stop in a parking spot in FIG. 2F. FIG. 2G shows the full sequence.

In another embodiment, when GNSS/GPS data become unavailable (e.g., in tunnels, underground parking) or inaccurate (e.g., nearby high-rise buildings) or sparse (e.g., keep low sampling rate to save on power consumption), the system 100 can apply the same approach as shown in FIGS. 2A-2G to estimate vehicle moving distances and maneuvers of the parking event, without using GNSS/GPS data.

FIG. 2H is a diagram 220 of example parking mode sequences, according to various embodiments. In one embodiment, the system 100 extracts a plurality of known time-based semantic/maneuver event sequences 221a-221n (collectively 221) of different parking modes from a stream of time-stamped raw data, e.g., sensor data 105) establish semantic/maneuver event sequences for different parking modes. Each parking mode (i.e., time-based semantic/maneuver event sequence 221) includes a set of semantic/maneuver events 223a-223m (collectively 223), while each semantic/maneuver event 223 is recorded as set of sensor values 225a-225h (collectively 225). The plurality of known sequences of semantic/maneuver events 221a-221n can be stored locally in the parking event data 121, and/or in the geographic database 131.

In one embodiment, a set of semantic events can be recorded in the form of movements, actions and/or maneuvers of a vehicle. In another embodiment, a set of semantic events can be recorded with sensor values converted from raw sensor data of one or more sensors (e.g., accelerometers, gyroscopes, magnetometers, barometers, etc.) of the UE 105 and/or the vehicle 101 in conjunction with the movements, actions and/or maneuvers of the UE 105 and/or the vehicle 101. By way of example, the set of time-sequence semantic events 221a of a perpendicular left/right forward bay parking mode can be recorded as semantic/maneuver events 223a-223m (1) the vehicle being in forward drive, (2) the vehicle may or may not stop (e.g., idle state) before parking, (3) turn left 90° (e.g., a sensor value 225a), (4) the vehicle stops, (5) there may be several reverse and forward drive maneuvers, and (6) the vehicle stops and its engine off. More example parking mode sequences are listed in the following Table 1 and Table 2.

In one embodiment, the GPS receiver 107, the barometer 111, the magnetometer 113, etc. may be included in an inertial measurement unit (IMU) 115 along with other sensors such as, but not limited to, a gyroscope. The GPS receiver 107 is used as an example. The broader category would be the global navigation satellite systems (GNSS), such as GPS, GALILEO, GLONASS and BEIDOU. Further, positioning can be performed using a combination of GNSS and Radio Signal based systems, such as WiFi, Bluetooth, Bluetooth low energy, 2/3/4/5G cellular signals, ultra-wideband (UWB) signals, etc. of the UE 105.

For instance, the system 100 can determine vehicle coordinates and directions of motion (e.g., forward, reverse, etc.) via location tracking (e.g., GPS sensors) and determine that the car is moving forward, e.g., its velocity is usually much higher and sustainable for longer periods of time compared to a reverse drive. Even when driving in places where GPS signal is unavailable or inaccurate, e.g., parking lots inside buildings, the system 100 can use other sensors (e.g., sensors in the IMU 115 than GPS receivers) to track parking maneuvers of the vehicle 101. By way of example, when using IMU sensors in the UE 105 travelling with the vehicle 101, the system 100 can determine a rotation matrix between a vehicle frame of reference and a device frame of reference, to convert the sensor data and determine vehicle coordinates and directions of motion accordingly.

As another instance, the system 100 can detect and/or quantify vehicle turns and lane changes by (1) following the trajectory of the vehicle 101 using location sensors, particularly in combination with map matching (when map data is available), or (2) using a standard sensor application programming interface (API) to obtain a rotation vector from a device frame of reference to a vehicle frame of reference, thereby obtaining the azimuthal and inclination angles.

As another instance, the system 100 can detect vehicle idle states, such as vehicle stop with engine off, vehicle idle with engine on, vehicle in motion, etc., via sensors and/or on-board control systems of the vehicle 101 (e.g., GPS readings and relevant speed information), and/or sensors in the UE 105 travelling with the vehicle 101. When GPS signal is unavailable (e.g., in underground parking, tunnels, or malfunctioning hardware), or low-quality signal (due to high rise buildings for instance), the system 100 can use UE sensors such as accelerometers, gyroscopes, and magnetometers to detect states of the vehicle.

In one embodiment, the system 100 can detect a vehicle speed using a frequency response of the magnetic field in the vehicle, thereby determining idle states of the vehicle (e.g., idle=speed zero). The system 100 can detect a vehicle speed using a frequency response of the magnetic field in the vehicle, since magnetometer is sensitive to changes in the magnetic field and the vehicle tires in most cases are steel-belted radial tires that tend to be magnetized. The net effect is that tires behave as rotating magnets such that the tire rotation frequency (related to speed) can be measured with the magnetometer.

In yet another embodiment, the system 100 can detect barometric pressure gradient with sensitive pressure sensors (e.g., to detect several cm of height change), thereby determining idle states of the vehicle (e.g., idle=zero pressure gradient). In addition, a barometric pressure spike in a pressure profile of the vehicle can be a sign of the vehicle door open/close that usually occurs after a vehicle is parked. In another embodiment, the system 100 can use sensor data of accelerometer(s) and/or gyroscope(s) to determine vibrations cause by a vehicle engine (e.g., an internal combustion engine), thereby determining idle states of the vehicle (e.g., idle=time-independent engine vibration). In some embodiments, the system 100 can apply additional signal processing for signal cleanup, remove background signals, apply filtering, and/or the like.

In short, the system 100 can detect transportation semantic events, more particularly, certain events taking place within or near a vehicle by using information captured by sensors (e.g., of a user's smartphone). In particular, the system 100 can detect and characterize parking events at a fine level, beyond the binary indication of parking. The parking may be parallel, perpendicular or at an angle relative to the street or in a garage, on the left or right side of the street, as well as semantic events of maneuvering into a parking spot (e.g., in forward or reverse drive, etc.). The system 100 can also monitor the drivers' parking proficiency, such as the number of maneuvers and time it takes to park the vehicle.

Figure 3:
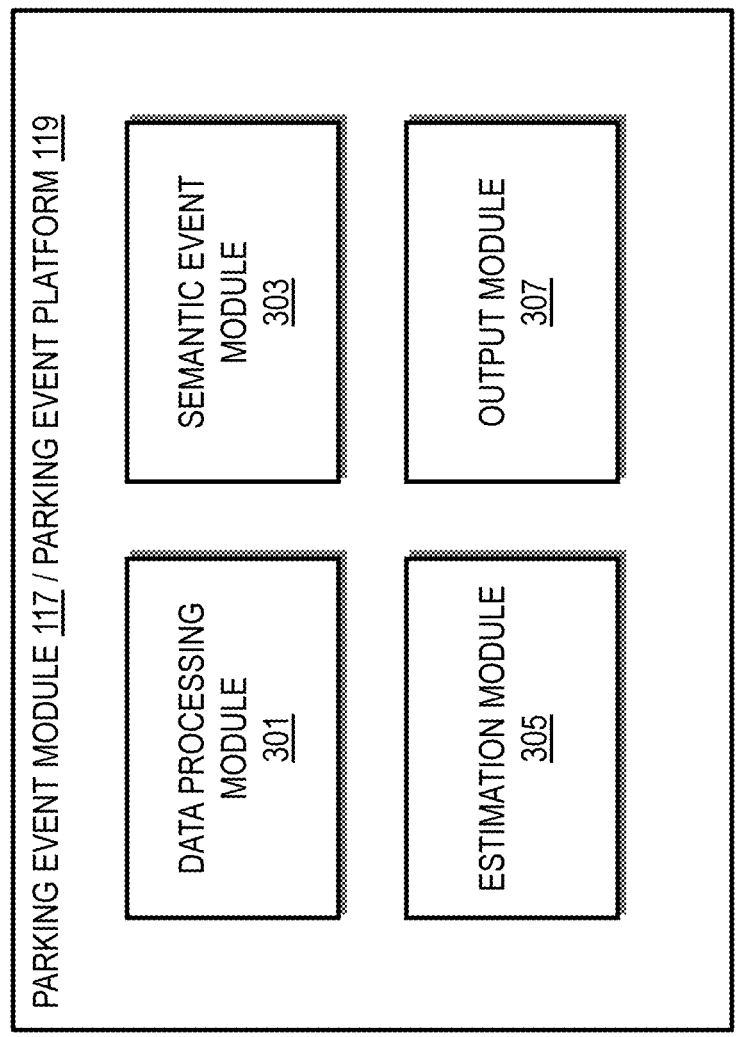
FIG. 3 is a diagram of a parking event module/parking event platform capable of determining a vehicle parking event and respective characteristics using sensor data, according to one embodiment.

FIG. 3 is a diagram of a parking event module/parking event platform capable of determining a vehicle parking event and respective characteristics using sensor data, according to one embodiment. In one embodiment, a parking event module 117 (e.g., a local component) and/or parking event platform 119 (e.g., a network/cloud component) may perform one or more functions or processes associated with determining a vehicle parking event and respective characteristics using sensor data (e.g., from the accelerometer 109 or equivalent sensors). By way of example, as shown in FIG. 3, the parking event module 117 and/or parking event platform 119 include one or more components for performing functions or processes of the various embodiments described herein. It is contemplated that the functions of these components may be combined or performed by other components of equivalent functionality. In one embodiment, the parking event module 117 and/or parking event platform 119 include a data processing module 301, a semantic event module 303, an estimation module 305, and an output module 307. The above presented modules and components of the parking event module 117 and/or parking event platform 119 can be implemented in hardware, firmware, software, or a combination thereof. In one embodiment, the parking event module 117, parking event platform 119, and/or any of their modules 301-307 may be implemented as a cloud-based service, local service, native application, or combination thereof. The functions of parking event module 117, parking event platform 119, and modules 301-307 are discussed with respect to FIGS. 3-5 below. For instance, the semantic event module 303 can work in conjunction with the estimation module 305 to detect a vehicle state (e.g., in motion, idle with engine on, stop with engine off), a turning event, a lane change, a direction of motion (e.g., forward or reverse drive), a door open/close, etc. using the following processes.

Figure 4:
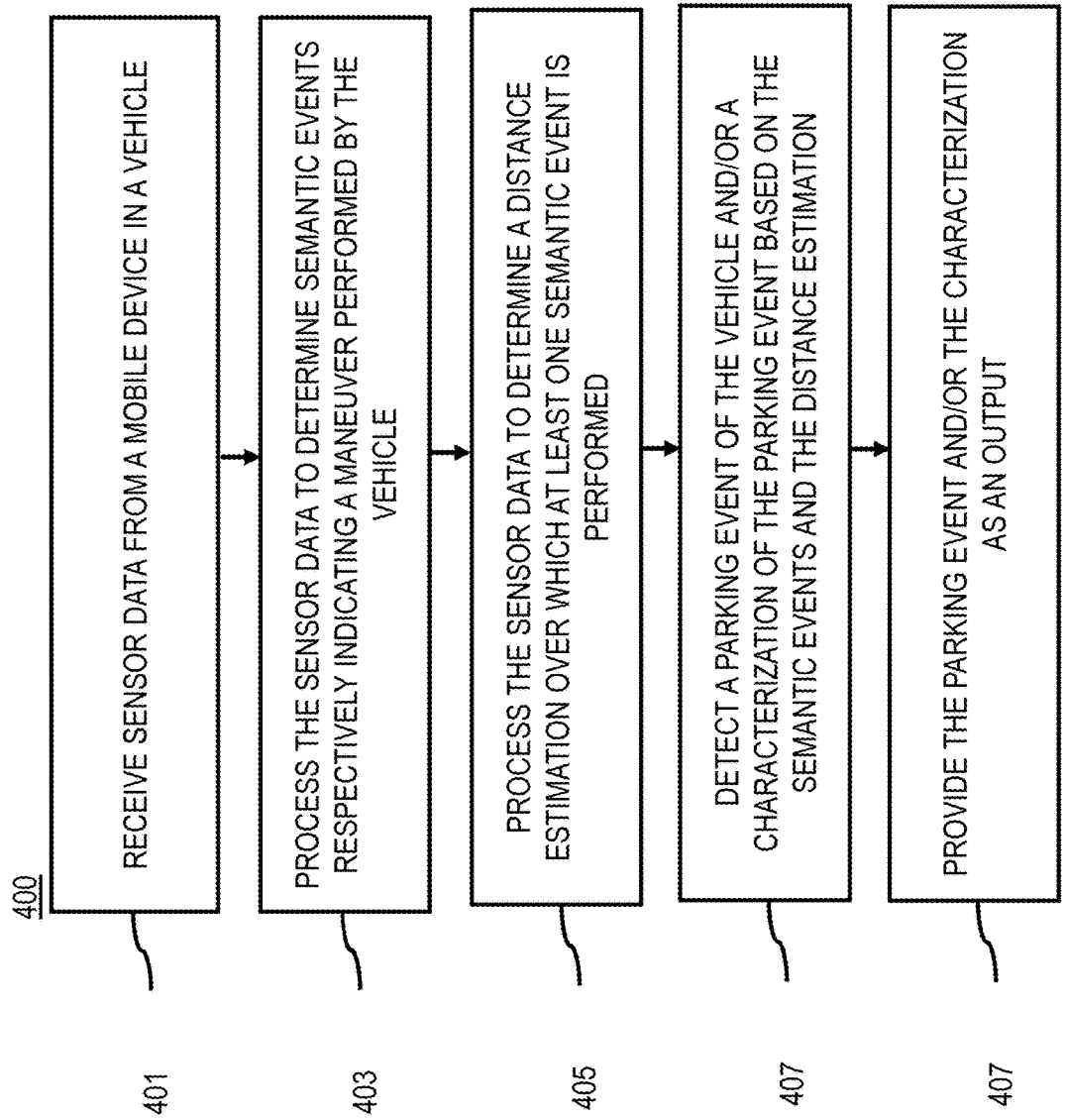
FIG. 4 is a flowchart of a process for determining a vehicle parking event and respective characteristics using sensor data, according to one embodiment.
Figure 11:
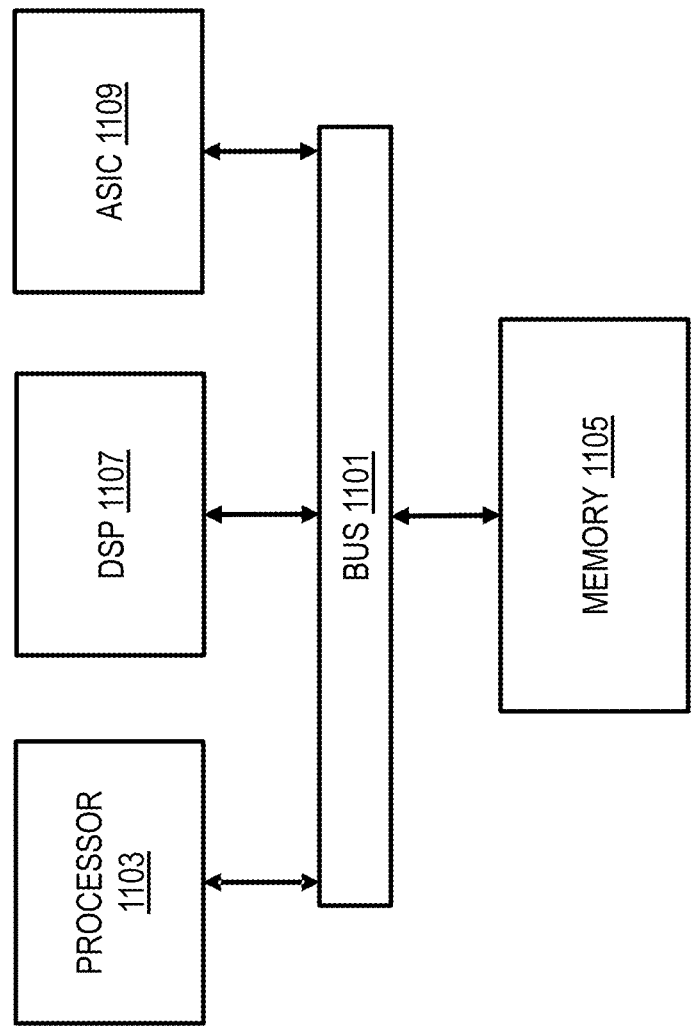
FIG. 11 is a diagram of a chip set that can be used to implement an embodiment.

FIG. 4 is a flowchart of a process for determining a vehicle parking event and respective characteristics using sensor data, according to one embodiment. In various embodiments, the parking event module 117, parking event platform 119, and/or any of their modules 301-307 may perform one or more portions of the process 400 and may be implemented in, for instance, a chip set including a processor and a memory as shown in FIG. 11. As such, the parking event module 117, parking event platform 119, and/or any of their modules 301-307 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all the illustrated steps.

In one embodiment, the process 400 can provide a practical approach for measuring vehicle moving distance and/or other parking information (e.g., parking modes, maneuvers, etc.) using the accelerometer 109 of the IMU 115, taking advantage of moving properties of the vehicle 101.

In one embodiment, in step 401, the data processing module 301 can receive sensor data (e.g., the sensor data 103 including the acceleration signals 104) from at least one sensor associated with a mobile device (e.g., UE 105) in a vehicle (e.g., the vehicle 101). By way of example, the at least one sensor is an inertial measurement unit (e.g., IMU 115) associated with a mobile device (e.g., the UE 105) in which a satellite-based location sensor (e.g., the GPS receiver 107) is unavailable or unused.

In one embodiment, in step 403, the semantic event module 303 can process the sensor data to determine a sequence of semantic events (e.g., the forward drive 201—stop—right lane change in the reverse drive 203—stop—the potential correction maneuver(s) 205 in FIG. 2C), and the semantic events respectively can indicate a maneuver performed by the vehicle 101.

For example, Table 1 lists a plurality of perpendicular bay parking maneuver sequences.

TABLE 1

| Forward left | Forward right | Reverse left | Reverse right |
| --- | --- | --- | --- |
| 1. Car is in forward drive | 1. Car is in forward drive | 1. Car is in forward drive | 1. Car is in forward drive |
| 2. Car may or may not stop | 2. Car may or may not stop | 2. Car does a $\alpha \approx 45°$ right | 2. Car does a $\alpha \approx 45°$ left |

TABLE 1-continued

| Forward left | Forward right | Reverse left | Reverse right |
| --- | --- | --- | --- |
| (idle state) before parking | (idle state) before parking | turn and stops ($\alpha$ is typically in the range 20°-90°) | turn and stops ($\alpha$ is typically in the range 20°-90°) |
| 3. Turn left 90° | 3. Turn right 90° | 3. The car does a $\alpha' = 90° - \alpha$ left turn in reverse drive, over a typical distance of 10 m (2-3 times the car length). | 3. The car does a $\alpha' = 90° - \alpha$ right turn in reverse drive, over a typical distance of 10 m (2-3 times the car length). |
| 4. Car stops | 4. Car stops | | |
| 5. There may be several reverse and forward drive maneuvers | 5. There may be several reverse and forward drive maneuvers | | |
| 6. Car stops, engine off | 6. Car stops, engine off | | |
| | | 4. Car stops | 4. Car stops |
| | | 5. There might be a few more forward-reverse drive maneuvers over short distances (1-2 times the car length) | 5. There might be a few more forward-reverse drive maneuvers over short distances (1-2 times the car length) |
| | | 6. Car stops, engine off | 6. Car stops, engine off |

As another example, Table 2 lists a plurality of parallel parking maneuver sequences.

TABLE 2

| Forward left | Forward right | Reverse left | Reverse right |
| --- | --- | --- | --- |
| 1. Car in forward drive | 1. Car in forward drive | 1. Car in forward drive | 1. Car in forward drive |
| 2. Lane change left followed by immediate car stop | 2. Lane change right followed by immediate car stop | 2. Car stops | 2. Car stops |
| | | 3. Car makes a lane change left in reverse drive | 3. Car makes a lane change left in reverse drive |
| 3. There may be several reverse and forward drive maneuvers | 3. There may be several reverse and forward drive maneuvers | 4. There may be several reverse and forward drive maneuvers | 4. There may be several reverse and forward drive maneuvers |
| 4. Car stops, engine off | 4. Car stops, engine off | 5. Car stops, engine off | 5. Car stops, engine off |

In one embodiment, in step 405, the estimation module 305 can process the sensor data (e.g., the sensor data 103 including the acceleration signals 104) to determine a distance estimation over which at least one of the semantic events (e.g., the forward drive 201 in FIG. 2C) is performed. For instance, the estimation module 305 can extract accelerometer data (e.g., the acceleration signals 104) from the sensor data 103, and integrate over the accelerometer data to determine the distance estimation (using the formula discussed in conjunction with FIG. 2A, parking maneuvers typically in 5-10 meters).

In one embodiment, in step 407, the data processing module 301 can detect a parking event of the vehicle (e.g., the parking event in FIG. 2C), a characterization of the parking event (e.g., a parking type such as perpendicular, parallel, or angular parking, or a parking mode such as left forward bay parking, right reverse parallel parking, left forward angular parking, etc.), or a combination thereof based on the sequence of semantic events and the distance estimation. By way of example, the characterization indicates a parking type of the parking event, and the parking type includes a perpendicular parking type (e.g., FIG. 2B), a parallel parking type (e.g., FIG. 2C), an angular parking type (e.g., FIG. 2D), or a combination thereof.

In one embodiment, the detecting of the parking event, the characterization of the parking event, or a combination thereof can be based on determining that the distance estimation is below a distance threshold associated with a parking maneuver. For instance, the distance threshold can be based on a length of the vehicle, such as 2-3 times the vehicle length, 1-2 times the vehicle length, etc. (as listed in Table 1). As another instance, the distance threshold can be based on a maneuver distance associated with the parking maneuver corresponding to at least one of the semantic events (e.g., a forward or reverse maneuver, a left or right turn maneuver, a stopping maneuver, or a combination thereof).

In one embodiment, the data processing module 301 can extract gear selection data from the sensor data. The gear selection data indicates whether the vehicle is in a forward drive gear or a reverse drive gear, and the semantic events, the sequence of the semantic events, or a combination thereof can be further based on the gear selection data.

In another embodiment, the data processing module 301 can extract engine activation data from the sensor data. The engine activation data can indicate whether an engine status of the vehicle 101 is on or off, and the semantic events, the sequence of the semantic events, or a combination thereof can be further based on the engine status. For instance, an idle state with the engine on can mean the vehicle is still executing a parking event, while a stop state with the engine off can mean the vehicle is parked.

In another embodiment, the data processing module 301 can extract air pressure data from the sensor data, typically using a barometer. The air pressure data can indicate whether a door status of the vehicle 101 is open or close, and the semantic events, the sequence of the semantic events, or a combination thereof can be further based on the door status. For instance, a vehicle door close state can mean the vehicle is still executing a parking event, while a vehicle door open state can mean the vehicle is parked.

The various embodiments described herein offer alternative ways for estimating moving distances of the vehicle 101 (e.g., information derived from sensors not normally used for the purpose of distance estimation but generally available in most modern phones and mobile devices) thereby determining a vehicle parking event and its maneuverer details (e.g., parking event data 121), especially when GNSS data is unavailable or sparse.

In one embodiment, in step 409, the output module 307 can provide the parking event, the characterization of the parking event, or a combination thereof as an output. For example, the output module 307 can provide the output to an user interface of the UE 105.

Figure 5:
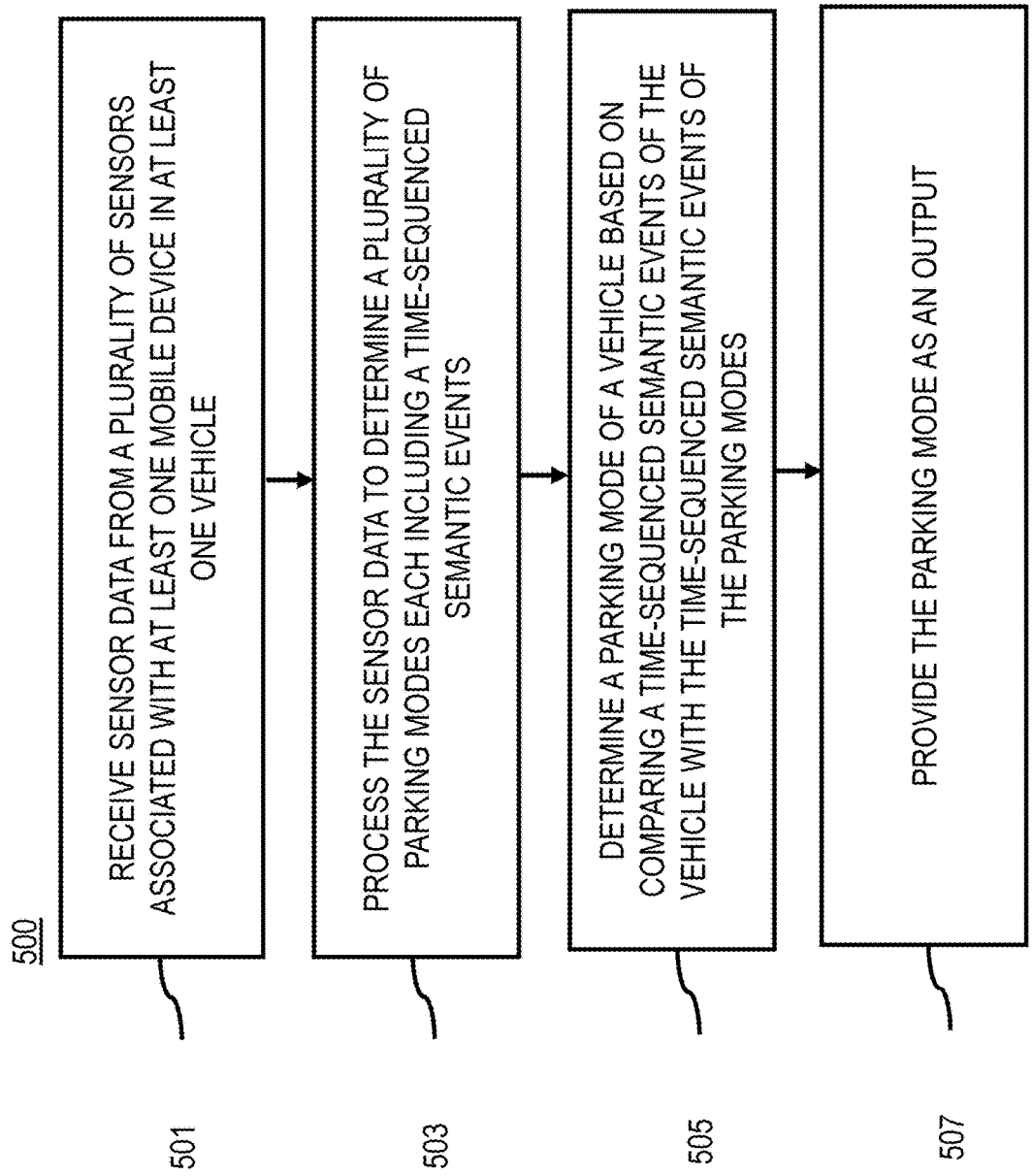
FIG. 5 is a flowchart of a process for determining a vehicle mode using sensor data, according to one embodiment.

FIG. 5 is a flowchart of a process for determining a vehicle mode using sensor data, according to one embodiment. In various embodiments, the parking event module 117, parking event platform 119, and/or any of their modules 301-307 may perform one or more portions of the process 500 and may be implemented in, for instance, a chip set including a processor and a memory as shown in FIG. 11. As such, the parking event module 117, parking event platform 119, and/or any of their modules 301-307 can provide means for accomplishing various parts of the process 500, as well as means for accomplishing embodiments of other processes described herein in conjunction with other components of the system 100. Although the process 500 is illustrated and described as a sequence of steps, its contemplated that various embodiments of the process 500 may be performed in any order or combination and need not include all the illustrated steps.

In one embodiment, in step 501, the data processing module 301 can receive sensor data from a plurality of sensors associated with at least one mobile device in at least one vehicle.

In one embodiment, in step 503, the sematic event module 303 can process the sensor data to determine a plurality of parking modes. For instance, each of the parking mode includes a time-sequenced semantic events, wherein each of the time-sequenced semantic events indicates a maneuver performed by the at least one vehicle. By way of example, the plurality of parking modes include one or more of left forward bay parking, right forward bay parking, left reverse bay parking, right reverse bay parking, left forward parallel parking, right forward parallel parking, left reverse parallel parking, right reverse parallel parking, left forward angular parking, right forward angular parking, left reverse angular parking, or right reverse angular parking.

In one embodiment, the estimation module 305 can extract accelerometer data from the sensor data, and integrate over the accelerometer data to determine a distance estimation (e.g., using the formula discussed in conjunction with FIG. 2A, parking maneuvers typically in 5-10 meters). The parking mode can be further detected based on the distance estimation. Then after, the detecting of the parking mode can be determined by the sematic event module 303 based on determining that the distance estimation is below a distance threshold (e.g., based on a length of the vehicle, such as 2-3 times the vehicle length, 1-2 times the vehicle length, etc. as listed in Table 1) associated with a parking maneuver.

In another embodiment, the estimation module 305 can extract data of one or more of an accelerometer, a gyroscope, a magnetometer, or a barometer from the sensor data, and integrate over the data to determine a vehicle idle state, an estimated turning angle, a lane change, a direction of motion, a door state, or a combination thereof of at least one of the time-sequenced semantic events. Then after, the parking mode can be further determined by the sematic event module 303 based the vehicle idle state, the estimated turning angle, the lane change, the direction of motion, the door state, or a combination thereof.

As mentioned, each of the vehicle idle state, the estimated turning angle, the lane change, the direction of motion, and the door state can be detected based on one or more of an accelerometer, a gyroscope, a magnetometer, or a barometer. Taking detecting a vehicle idle state by the sematic event module 303 as an example, (1) in a stop and engine off state: vehicle vibrations levels being the lowest and similar in magnitude like placing the UE 105 on a desk, (2) in an idle and engine on state: vibrations levels being significantly higher (as originating from idle engine vibrations) yet stationary (i.e., on average time independent), and (3) in a non-idle (in motion) state: vibrations level increasing significantly. The major engine vibrations increasing causes include high speeds, tires imbalance and/or imperfections, road roughness, etc. that lead to much stronger vibrations forming a nonstationary profile. FIGS. 6A-6C illustrating example speed/acceleration profiles of a vehicle, according to various embodiments.

By way of example, FIG. 6A depicts a speed profile for a sample ride of ~4000 seconds. The light-gray line represents vehicle speeds reported by an UE location sensor (e.g., a GPS receiver), and the dark-gray line represents vehicle speeds computed by the UE 105 using simple numerical differentiation over the positions. The gray sections represent time segments when the vehicle 101 was idle (fully stopped), such as at traffic lights, parking maneuvers, etc. These stops can be identified by the estimation module 305 using an algorithm and are in agreement with the zero-speed sections reported by a reference location system (e.g., a GPS receiver) of the UE 105. FIG. 6B depicts a zoom-in portion of FIG. 6A over the initial ~1200 seconds of the ride, e.g., an acceleration profile during the ride as measured by an accelerometer of the UE 105. The accelerometer can measure an acceleration of the UE 105 as a voltage. The lower graph of wave packet(s) represents magnitudes of accelerations ("acc"), and the upper graph of wave packet(s) represents magnitude square values ("acc^2", energy) when the vehicle 101 was in motion, while the gray sections represent time segments when the vehicle 101 was idle. FIG. 6C depicts another zoom-in portion of FIG. 6A over the final 1000 seconds of the ride as measured by the accelerometer (e.g., within the UE 105). Similarly, the lower graph of wave packet(s) represents magnitudes of accelerations ("acc"), the upper graph of wave packet(s) represents magnitude square values ("acc^2"), while the gray sections represent time segments when the vehicle 101 was idle. However, the last idle section corresponds to turning off the engine at the end of ride (i.e., the vehicle 101 was stop with its engine off), showing substantially lower variability in a noise level.

As another example, the estimation module 305 can detect a barometric pressure gradient with sensitive pressure sensors (e.g., to detect several cm of height change), thereby determining idle states of the vehicle 101 (e.g., idle=zero pressure gradient). In addition, a barometric pressure spike in a pressure profile of the vehicle can be a sign of the vehicle door open/close that usually occurs when a vehicle is idle/parked. FIGS. 7A-7B illustrating example pressure/acceleration profiles of a vehicle, according to various embodiments.

FIG. 7A depicts a pressure line (i.e., a black line) crossing via a squared acceleration ("acc^2") graph of wave packet(s) in the x axis during a ride of ~350 seconds. While idle, the vehicle pressure is roughly constant (as marked by black vertical lines). While in motion, the vehicle pressure profile reflects pressure/height variations along the ride (e.g., in 2-digit meters range). FIG. 7B depicts a zoom-in portion of ~220-234 seconds of FIG. 7A at an idle time with the vehicle engine on. The localized changes in pressure at the positions of the black vertical lines can be caused by opening/closing a vehicle door. On the other hand, if the vehicle 101 was simply waiting for traffic at an idle state, the pressure can be a constant without changes.

In one embodiment, the sematic event module 303 and/or the estimation module 305 can apply multiple independent sensors/algorithms for detecting an idle state, for example, for redundancy in case when some sensors are missing or malfunctioning. For instance, the estimation module 305 can apply one or more idle estimation algorithms on overlapping time windows (e.g., of 4-5 seconds) for online detection of an idle state. Such algorithms for calculating a local estimate of an idle state per window can include (1) standard deviation of accelerometer magnitude or energy, (2) standard deviation of gyroscope magnitude or energy, (3) spectral content of accelerometer and/or gyroscope, (4) speed based on magnetic field measurements, (5) variations and spikes in magnetic fields during engine ignition, (6) GPS/GNSS based location and speed information, (7) standard deviation of barometric pressure and/or pressure gradient, (8) a machine learning/AI classifier based on the above idle estimation algorithms and optionally using raw sensors data for training, etc.

In one embodiment, by the sematic event module 303 and/or the estimation module 305 can conduct a stationarity test. A key feature of being idle is the stationarity of the sensor data. The estimation module 305 can approximately establish stationarity using various heuristics (such as testing for small changes between consecutive windows) and/or using more formal approaches such as analysis of an auto-correlation function, a Dickey-Fuller test, and other statistical hypothesis testing.

In one embodiment, by the sematic event module 303 and/or the estimation module 305 can perform reinforcement learning/self-calibration. Since sensor performance and vehicle responses in the various states may vary significantly among different UEs and vehicles (of different vehicle makers and models), the estimation module 305 can calibrate and possibly learn thresholds and other model parameters for different UEs/vehicles. For instance, the estimation module 305 can perform a self-calibration procedure on the fly as follows: carrying out a stop with engine off calibration during prolonged periods when the UE 105 is not in use (e.g., during nighttime), and/or carrying out an idle with engine on (also a non-idle state) calibration at periods when GPS/GNSS signal is clear (e.g., an iterative process of recalibration as accumulating more data, such as to maximize the agreement between the various idle estimation algorithms as described).

In one embodiment, in step 505, the sematic event module 303 can determine a parking mode of a vehicle based on comparing a time-sequenced semantic events of the vehicle with time-sequenced semantic events of the plurality of parking modes (e.g., the example parking mode sequences listed in FIG. 2H). In one embodiment, in step 507, the output module 307 can provide the parking mode as an output.

Figure 8A:
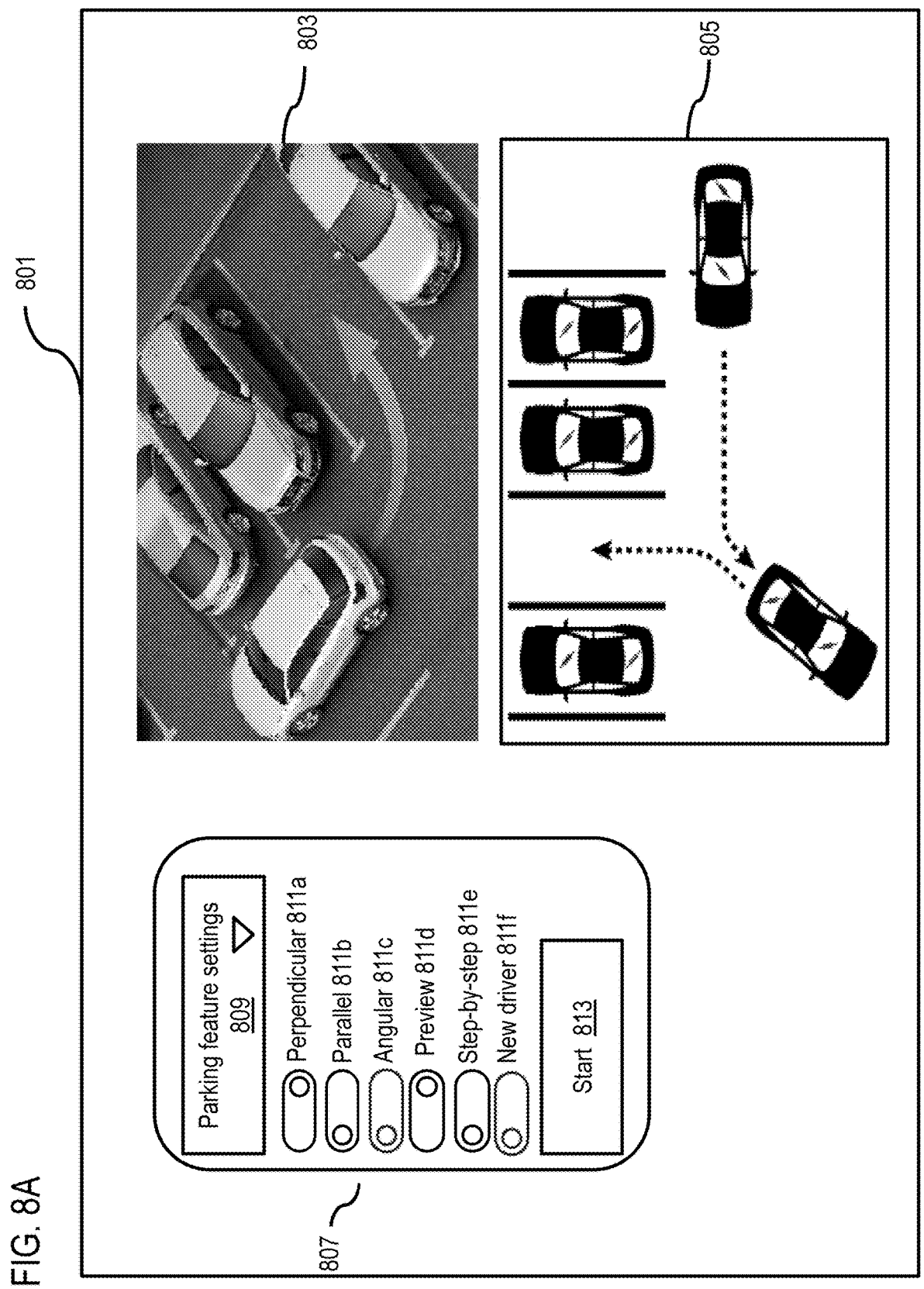
FIG. 8A is a diagram of a user interface associated parking assistance, according to one embodiment.

By way of example, the output module 307 can present/visualize a parking assist event and/or a parking event on a user interface. FIG. 8A is a diagram of a user interface associated parking assistance, according to one embodiment. In this example, the UI 801 shown may be generated for a UE 105 (e.g., a mobile device, an embedded navigation system of the vehicle 101, a driving trainer terminal, a server of a vehicle fleet operator, a server of a vehicle insurer, etc.) that depicts a live street image 803 and a parking diagram 805. The UI 801 further shows a display setting panel 807 that includes an parking setting feature dropdown menu 809, a plurality of parking feature switches 811, and an input 813 of "Start." By way of example, the parking setting feature switches 811 included perpendicular 811a, parallel 811b, angular 811c, preview 811d, step-by-step 811e, new driver 811f, etc.

In this case, the parking setting features: the perpendicular 811a and the preview 811d are switched on by a user (e.g., a driver, a passenger, a driving instructor, a vehicle fleet management personnel, a vehicle insurance personnel, etc. with different levels of data access based on credentials). The user can be a human and/or artificial intelligence. Fleet management goes beyond vehicle dispatch, and further include purchasing and maintaining vehicles, registering and licensing vehicles, cutting costs and maximizing profits, etc. For instance, the live street image 803 shows a live image of the vehicle 101 and its nearby perpendicular parking bay. The system 100 can present the parking diagram 805 to show a preview of the maneuver sequences to park into one perpendicular parking space.

Figure 8B:
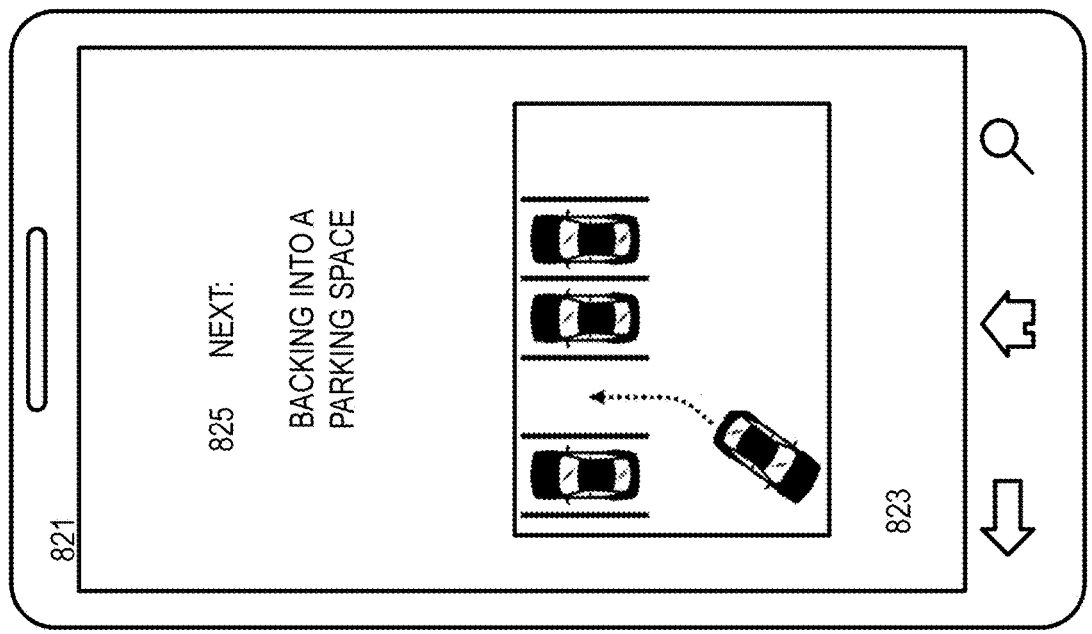
FIG. 8B is a diagram of a user interface displaying a parking event, according to one embodiment.

Subsequently, the parking assist feature of the step-by-step 811e is switched on by the user, and in response to the user interacting with the input 813, the system 100 can process sensor data to determine a sequence of semantic events and to determine a distance estimation over which at least one of the semantic events is performed as in the process 400, thereby continuously detecting the parking event progress. FIG. 8B is a diagram of an example user interface showing a parking event, according to one embodiment. In this example, a UI 821 shown is generated for a UE 105 (e.g., a mobile device, an embedded navigation system, a client terminal, etc.) that includes a parking maneuver diagram 823. By way of example, the system 100 can detect that the user finished the first sequence of parking maneuvers of (e.g., a forward drive at a slight right turn at an angle and a full stop). The system 100 can then recommend the next sequence of parking maneuvers (e.g., a reverse drive at another angle and a full stop in a parking spot) via the parking maneuver diagram 823 and an instruction 825: "Next: backing into a parking space."

In one embodiment, the system 100 can set different users with different access rights to different parking setting features as well as different granular levels within each data feature. When the user selectively switches on the other parking setting features, such the new driver 811f, the system 100 can factor in additional parking setting feature(s) to compute the next sequence of parking maneuvers for a new driver using, for example, the process 400.

In another embodiment, the system 100 may be configured to dynamically, in real-time, or substantially in real-time, adjust the next sequence of parking maneuvers based on demand and supply changes in the parking spaces, customers, etc. and display on the UI 801 accordingly. In yet another embodiment, the system 100 may be configured to dynamically, in real-time, or substantially in real-time, adjust the next sequence of parking maneuvers based on other contextual changes in weather, parking costs, etc.

In other embodiments, the parking event data 121 can be provided by the output module 307 as an output over a communications network 123 to a service platform 125 including one or more services 127a-127k (also referred to as services 127). As discussed above, the services 127 can include, but are not limited to, mapping services, navigation services, parking guiding services, driving training services, vehicle insurance services, and/or the like that can combine the parking event data 121 with digital map data (e.g., a geographic database 131) to provide location-based services. It is also contemplated that the services 127 can include any service that uses the parking event data 121 to provide or perform any function. In one embodiment, the parking event data 121 can also be used by one or more content providers 129a-129j (also collectively referred to as content providers 129). These content providers 129 can aggregate and/or process the parking event data 121 to provide the processed data to its users such as the service platform 125 and/or services 127. The sensor data 103 and/or the parking event data 121 can be stored in a stand-alone database, or a geographic database 131 that also stores map data.

Returning to FIG. 1, the system 100 comprises one or more vehicles 101 associated with one or more UEs 105 having respective parking event modules 117 and/or connectivity to the parking event platform 119. The UE 105 can be mounted to the dashboard or other fixed position within the vehicle 101 or carried by a driver/passenger of the vehicle 101. The sensors can be standalone sensors within the UE 105 or part of an IMU 115 within the UE 105. It is noted, however, that embodiments in which the sensors are included within the UE 105 are provided by way of illustration and not as a limitation. In other embodiments, it is contemplated that the sensors (e.g., the magnetometer 113 and/or accelerometer 109) may be mounted externally to the UE 105 (e.g., as a component of the vehicle 101 or other device within the vehicle 101). In addition, the parking event module 117 for calculating the distances or other parking characteristic/information of the vehicle 101 according to the embodiments described herein need not reside within the UE 105 and can also be included as a component of the vehicle 101 and/or any other device internal or external to the vehicle 101.

By way of example, the UEs 105 may be a personal navigation device ("PND"), a cellular telephone, a mobile phone, a personal digital assistant ("PDA"), a watch, a camera, a computer, an in-vehicle or embedded navigation system, and/or other device that is configured with multiple sensors types (e.g., accelerometers 109, magnetometers 113, etc.) that can be used for determined vehicle speed according to the embodiments described herein. It is contemplated, that the UE 105 (e.g., cellular telephone or other wireless communication device) may be interfaced with an on-board navigation system of an autonomous vehicle or physically connected to the vehicle 101 for serving as a navigation system. Also, the UEs 105 and/or vehicles 101 may be configured to access the communications network 123 by way of any known or still developing communication protocols. Via this communications network 123, the UEs 105 and/or vehicles 101 may transmit sensor data collected from IMU or equivalent sensors for facilitating vehicle speed calculations.

The UEs 105 and/or vehicles 101 may be configured with multiple sensors of different types for acquiring and/or generating sensor data according to the embodiments described herein. For example, sensors may be used as GPS or other positioning receivers for interacting with one or more location satellites to determine and track the current speed, position and location of a vehicle travelling along a roadway. In addition, the sensors may gather IMU data, NFC data, Bluetooth data, acoustic data, barometric data, tilt data (e.g., a degree of incline or decline of the vehicle during travel), motion data, light data, sound data, image data, weather data, temporal data and other data associated with the vehicle and/or UEs 105 thereof. Still further, the sensors may detect local or transient network and/or wireless signals, such as those transmitted by nearby devices during navigation of a vehicle along a roadway. This may include, for example, network routers configured within a premise (e.g., home or business), another UE 105 or vehicle 101 or a communicable traffic system (e.g., traffic lights, traffic cameras, traffic signals, digital signage).

By way of example, the parking event module 117 and/or parking event platform 119 may be implemented as a cloud-based service, hosted solution or the like for performing the above described functions. Alternatively, the parking event module 117 and/or parking event platform 119 may be directly integrated for processing data generated and/or provided by the service platform 125, one or more services 127, and/or content providers 129. Per this integration, the parking event platform 119 may perform client-side state computation of vehicle speed data.

By way of example, the communications network 123 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

A UE 105 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that a UE 105 can support any type of interface to the user (such as "wearable" circuitry, etc.).

By way of example, the UE 105s, the parking event module 117/parking event platform 119, the service platform 125, and the content providers 129 communicate with each other and other components of the communications network 123 using well known, new or still developing protocols. In this context, a protocol includes a set of rules defining how the network nodes within the communications network 123 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
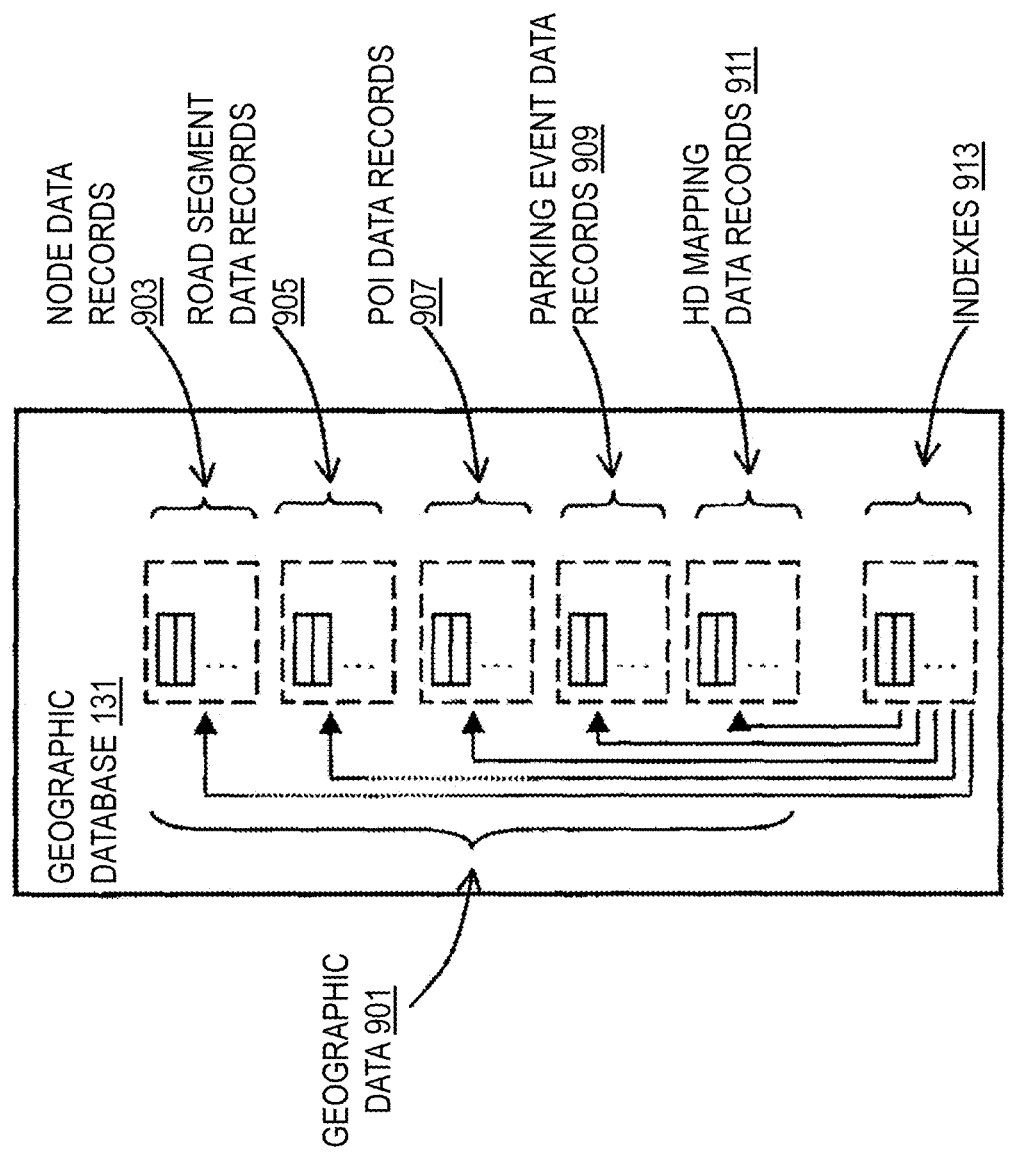
FIG. 9 is a diagram of a geographic database, according to one embodiment.

FIG. 9 is a diagram of a geographic database (such as the database 131), according to one embodiment. In one embodiment, the geographic database 131 includes geographic data 901 used for (or configured to be compiled to be used for) mapping and/or navigation-related services, such as for video odometry based on the parametric representation of lanes include, e.g., encoding and/or decoding parametric representations into lane lines. In one embodiment, the geographic database 131 include high resolution or high definition (HD) mapping data that provide centimeter-level or better accuracy of map features. For example, the geographic database 131 can be based on Light Detection and Ranging (LiDAR) or equivalent technology to collect billions of 3D points and model road surfaces and other map features down to the number lanes and their widths. In one embodiment, the mapping data (e.g., mapping data records 911) capture and store details such as the slope and curvature of the road, lane markings, roadside objects such as signposts, including what the signage denotes. By way of example, the mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 131.

"Node"— A point that terminates a link.

"Line segment"— A straight line connecting two points.

"Link" (or "edge")— A contiguous, non-branching string of one or more line segments terminating in a node at each end.

"Shape point"— A point along a link between two nodes (e.g., used to alter a shape of the link without defining new nodes).

"Oriented link"— A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 131 follows certain conventions. For example, links do not cross themselves and do not cross each other except at a node. Also, there are no duplicated shape points, nodes, or links. Two links that connect each other have a common node. In the geographic database 131, overlapping geographic features are represented by overlapping polygons. When polygons overlap, the boundary of one polygon crosses the boundary of the other polygon. In the geographic database 131, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 131 includes node data records 903, road segment or link data records 905, POI data records 907, parking event data records 909, mapping data records 911, and indexes 913, for example. More, fewer or different data records can be provided. In one embodiment, additional data records (not shown) can include cartographic ("carto") data records, routing data, and vehicle event data. In one embodiment, the indexes 913 may improve the speed of data retrieval operations in the geographic database 131. In one embodiment, the indexes 913 may be used to quickly locate data without having to search every row in the geographic database 131 every time it is accessed. For example, in one embodiment, the indexes 913 can be a spatial index of the polygon points associated with stored feature polygons.

In exemplary embodiments, the road segment data records 905 are links or segments representing roads, streets, or paths, as can be used in the calculated route or recorded route information for determination of one or more personalized routes. The node data records 903 are end points corresponding to the respective links or segments of the road segment data records 905. The road link data records 905 and the node data records 903 represent a road network, such as used by vehicles, cars, and/or other entities. Alternatively, the geographic database 131 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 131 can include data about the POIs and their respective locations in the POI data records 907. The geographic database 131 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In one embodiment, the geographic database 131 can also include parking event data records 909 for storing sensor data, historical sensor calibration data, parking event data, parking maneuver data, parking event prediction models, annotated observations, computed mobile device location/orientation distributions, sampling probabilities, and/or any other data generated or used by the system 100 according to the various embodiments described herein. By way of example, the parking event data records 909 can be associated with one or more of the node records 903, road segment records 905, and/or POI data records 907 to support localization or visual odometry based on the features stored therein and the corresponding estimated quality of the features. In this way, the records 909 can also be associated with or used to classify the characteristics or metadata of the corresponding records 903, 905, and/or 907.

In one embodiment, as discussed above, the mapping data records 911 model road surfaces and other map features to centimeter-level or better accuracy. The mapping data records 911 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the mapping data records 911 are divided into spatial partitions of varying sizes to provide mapping data to vehicles 101 and other end user devices with near real-time speed without overloading the available resources of the vehicles 101 and/or devices (e.g., computational, memory, bandwidth, etc. resources).

In one embodiment, the mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the mapping data records 911.

In one embodiment, the mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 131 can be maintained by the content provider 131 in association with the services platform 117 (e.g., a map developer). The map developer can collect geographic data to generate and enhance the geographic database 131. There can be different ways used by the map developer to collect data. These ways can include obtaining data from other sources, such as municipalities or respective geographic authorities. In addition, the map developer can employ field personnel to travel by vehicle (e.g., vehicles 101 and/or UEs 105) along roads throughout the geographic region to observe features and/or record information about them, for example. Also, remote sensing, such as aerial or satellite photography, can be used.

The geographic database 131 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or a UE 105, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for determining a vehicle parking event and respective characteristics using sensor data may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
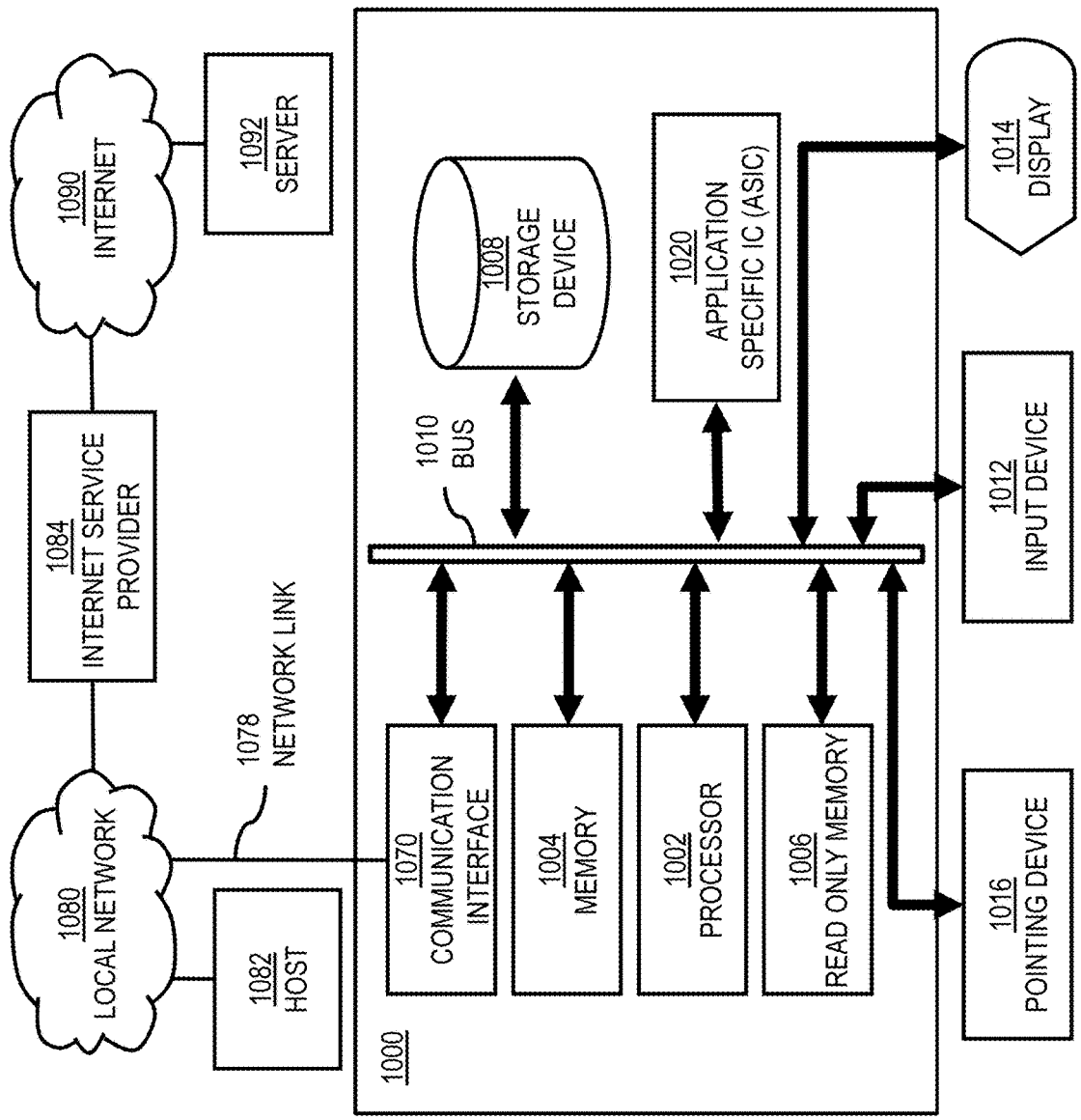
FIG. 10 is a diagram of hardware that can be used to implement an embodiment.

FIG. 10 illustrates a computer system 1000 upon which an embodiment of the invention may be implemented. Computer system 1000 is programmed (e.g., via computer program code or instructions) to determine a vehicle parking event and respective characteristics using sensor data as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to determining a vehicle parking event and respective characteristics using sensor data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for determining a vehicle parking event and respective characteristics using sensor data. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for determining a vehicle parking event and respective characteristics using sensor data, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 123 for determining a vehicle parking event and respective characteristics using sensor data from the UE 105.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system can be deployed in various configurations within other computer systems, e.g., host 1082 and server 1092.

FIG. 11 illustrates a chip set 1100 upon which an embodiment of the invention may be implemented. Chip set 1100 is programmed to determine a vehicle parking event and respective characteristics using sensor data as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to determine a vehicle parking event and respective characteristics using sensor data. The memory 1105 also stores the data associated with or generated by the execution of the inventive steps.

Figure 12:
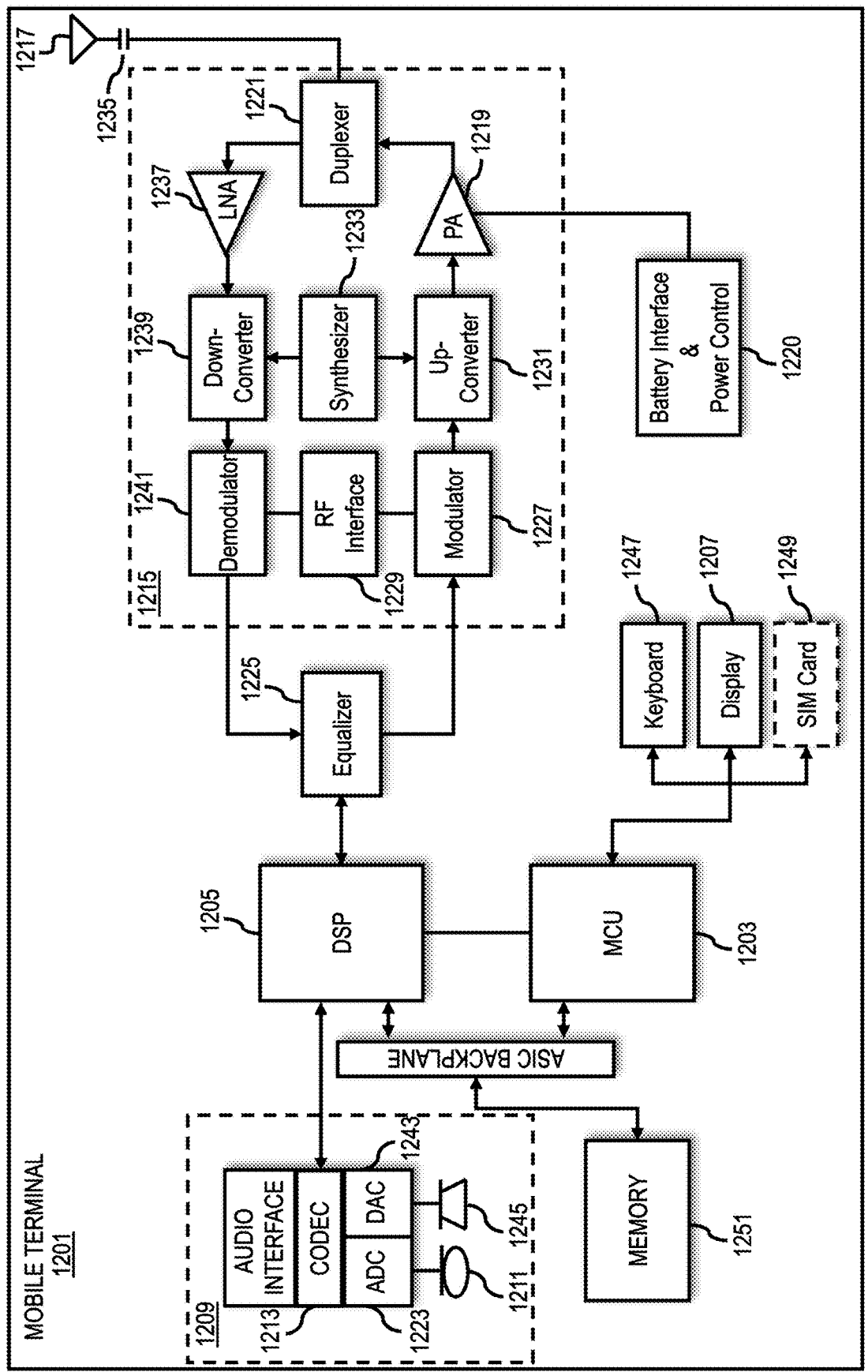
FIG. 12 is a diagram of a mobile terminal that can be used to implement an embodiment.

FIG. 12 is a diagram of exemplary components of a mobile terminal 1201 (e.g., handset or vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to determine a vehicle parking event and respective characteristics using sensor data. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
receiving sensor data from at least one sensor associated with a mobile device in a vehicle, wherein the at least one sensor comprises an accelerometer, a gyroscope, a magnetometer, or a combination thereof that is configured to collect the sensor data for a designated distance or time associated with a parking maneuver performed by the vehicle to minimize an error accumulation in the sensor data over the designated distance or time;
processing the sensor data to determine a sequence of semantic events, wherein the semantic events respectively indicate the parking maneuver performed by the vehicle;
processing the sensor data to determine a distance estimation over which at least one of the semantic events is performed;
detecting a parking event of the vehicle, a characterization of the parking event, or a combination thereof based on the sequence of semantic events and the distance estimation; and
providing the parking event, the characterization of the parking event, or a combination thereof as an output.

2. The method of claim 1, further comprising:
extracting accelerometer data from the sensor data; and
integrating over the accelerometer data to determine the distance estimation.

3. The method of claim 1, wherein the detecting of the parking event, the characterization of the parking event, or a combination thereof is based on determining that the distance estimation is below a distance threshold associated with a parking maneuver.

4. The method of claim 3, wherein the distance threshold is based on a length of the vehicle.

5. The method of claim 3, wherein the distance threshold is based on a maneuver distance associated with the parking maneuver corresponding to at least one of the semantic events.

6. The method of claim 5, wherein the parking maneuver corresponding to the at least one of the semantic events includes a forward or reverse maneuver, a left or right turn maneuver, a stopping maneuver, or a combination thereof.

7. The method of claim 1, wherein the characterization indicates a parking type of the parking event, and wherein the parking type includes a perpendicular parking type, a parallel parking type, an angular parking type, or a combination thereof.

8. The method of claim 1, further comprising:
extracting gear selection data from the sensor data,
wherein the gear selection data indicates whether the vehicle is in a forward drive gear or a reverse drive gear; and
wherein the semantic events, the sequence of the semantic events, or a combination thereof are further based on the gear selection data.

9. The method of claim 1, further comprising:
extracting engine activation data from the sensor data,
wherein the engine activation data indicates whether an engine status of the vehicle is on or off; and
wherein the semantic events, the sequence of the semantic events, or a combination thereof are further based on the engine status.

10. The method of claim 1, further comprising:
extracting air pressure data from the sensor data,
wherein the air pressure data indicates whether a door status of the vehicle is open or close, and
wherein the semantic events, the sequence of the semantic events, or a combination thereof are further based on the door status.

11. The method of claim 1, wherein the at least one sensor is an inertial measurement unit associated with a mobile device in which a satellite-based location sensor is unavailable or unused.

12. An apparatus comprising:
at least one processor; and
at least one memory including computer program code for one or more programs,
the at least one memory and the computer program code configured to, with the at least one processor, cause the apparatus to perform at least the following,
receive sensor data from a plurality of sensors associated with at least one mobile device in at least one vehicle, wherein the at least one sensor comprises an accelerometer, a gyroscope, a magnetometer, or a combination thereof that is configured to collect the sensor data for a designated distance or time associated with a parking maneuver performed by the vehicle to minimize an error accumulation in the sensor data over the designated distance or time;
process the sensor data to determine a plurality of parking modes, wherein each of the parking mode includes a time-sequenced semantic events, wherein each of the time-sequenced semantic events indicates the parking maneuver performed by the at least one vehicle;
determine a parking mode of a vehicle based on comparing a time-sequenced semantic events of the vehicle with time-sequenced semantic events of the plurality of parking modes; and
provide the parking mode as an output.

13. The apparatus of claim 12, wherein the apparatus is further caused to:
extract accelerometer data from the sensor data; and
integrate over the accelerometer data to determine the distance estimation,
wherein the parking mode is further determined based on the distance estimation.

14. The apparatus of claim 13, wherein the parking mode is based on determining that the distance estimation is below a distance threshold associated with a parking maneuver.

15. The apparatus of claim 14, wherein the distance threshold is based on a length of the vehicle.

16. The apparatus of claim 12, wherein the apparatus is further caused to:
extract data of one or more of an accelerometer, a gyroscope, a magnetometer, or a barometer from the sensor data; and
integrate over the data to determine a vehicle idle state, an estimated turning angle, a lane change, a direction of motion, a door state, or a combination thereof of at least one of the time-sequenced semantic events,
wherein the parking mode is further determined based on the vehicle idle state, the estimated turning angle, the lane change, the direction of motion, the door state, or a combination thereof.

17. The apparatus of claim 12, wherein the plurality of parking modes include one or more of left forward bay parking, right forward bay parking, left reverse bay parking, right reverse bay parking, left forward parallel parking, right forward parallel parking, left reverse parallel parking, right reverse parallel parking, left forward angular parking, right forward angular parking, left reverse angular parking, or right reverse angular parking.

18. A non-transitory computer-readable storage medium carrying one or more sequences of one or more instructions which, when executed by one or more processors, cause an apparatus to perform:
- receiving sensor data from at least one sensor associated with a mobile device in a vehicle, wherein the at least one sensor comprises an accelerometer, a gyroscope, a magnetometer, or a combination thereof that is configured to collect the sensor data for a designated distance or time associated with a parking maneuver performed by the vehicle to minimize an error accumulation in the sensor data over the designated distance or time;
- processing the sensor data to determine a sequence of semantic events, wherein the semantic events respectively indicate the parking maneuver performed by the vehicle;
- processing the sensor data to determine a distance estimation over which at least one of the semantic events is performed;
- detecting a parking event of the vehicle, a characterization of the parking event, or a combination thereof based on the sequence of semantic events and the distance estimation; and
- providing the parking event, the characterization of the parking event, or a combination thereof as an output.

19. The non-transitory computer-readable storage medium of claim 18, wherein the apparatus is caused to further perform:
- extracting accelerometer data from the sensor data; and
- integrating over the accelerometer data to determine the distance estimation.

20. The non-transitory computer-readable storage medium of claim 18, wherein the detecting of the parking event, the characterization of the parking event, or a combination thereof is based on determining that the distance estimation is below a distance threshold associated with a parking maneuver.

* * * * *